(12) United States Patent
Dohta

(10) Patent No.: US 8,345,000 B2
(45) Date of Patent: Jan. 1, 2013

(54) STORAGE MEDIUM HAVING GAME PROGRAM STORED THEREIN, GAME APPARATUS, AND TILT ANGLE CORRECTION METHOD

(75) Inventor: Takuhiro Dohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 540 days.

(21) Appl. No.: 12/614,693

(22) Filed: Nov. 9, 2009

(65) Prior Publication Data

US 2011/0025596 A1 Feb. 3, 2011

(30) Foreign Application Priority Data

Jul. 31, 2009 (JP) .................... 2009-178866

(51) Int. Cl.
*G09G 5/00* (2006.01)
(52) U.S. Cl. .................... 345/156; 345/157; 345/179
(58) Field of Classification Search .......... 345/156–157, 345/179
See application file for complete search history.

(56) References Cited

U.S. PATENT DOCUMENTS

2008/0309618 A1* 12/2008 Okada ..................... 345/157
2010/0182284 A1* 7/2010 Tremblay .................. 345/179

FOREIGN PATENT DOCUMENTS

JP 6-190144 7/1994

* cited by examiner

*Primary Examiner* — William Boddie
*Assistant Examiner* — Leonid Shapiro
(74) *Attorney, Agent, or Firm* — Nixon & Vanderhye PC

(57) ABSTRACT

An information processing device performs a game process based on a tilt angle of an input device that can be rotated to any tilt about a predetermined axis. First, a game apparatus calculates a tilt angle representing the tilt of the input device. Then, the game apparatus determines whether the calculated tilt angle has transitioned across the boundary between the upper limit value and the lower limit value of the tilt angle. If the tilt angle has transitioned across the boundary, the tilt angle to be used in a predetermined information process is corrected to a predetermined value that is on one side of the boundary on which the tilt angle was before crossing the boundary.

19 Claims, 13 Drawing Sheets

STORAGE MEDIUM HAVING GAME PROGRAM STORED THEREIN, GAME APPARATUS, AND TILT ANGLE CORRECTION METHOD

CROSS REFERENCE TO RELATED APPLICATION

The disclosure of Japanese Patent Application No. 2009-178866, filed Jul. 31, 2009, is incorporated herein by reference.

BACKGROUND OF THE INVENTION

1. Field of the Invention

The present invention relates to a storage medium having stored therein a game program, a game apparatus and a tilt angle correction method, and more particularly to a storage medium having stored therein a game program with which one performs a game process based on the tilt of an input device that can be tilted at any tilt angle, a game apparatus and a tilt angle correction method.

2. Description of the Background Art

Patent document 1 (Japanese Laid-Open Patent Publication No. 6-190144) discloses a game apparatus with which one can perform a game operation by tilting a controller. The controller ("control key device") described in Patent document 1 includes therein a 3-axis acceleration sensor, and the tilt angle of the controller is calculated using the detection result of the acceleration sensor. Patent document 1 also describes a vehicle driving game using the controller, in which the tilt angle of the controller is associated with the rotation angle of the steering wheel of the vehicle appearing in the game.

In Patent document 1, the tilt angle of the controller and the rotation angle of the steering wheel of the vehicle are associated with each other. That is, in Patent document 1, rotating the controller to the left from the reference state will rotate the steering wheel to the left, and rotating the controller to the right from the reference state will rotate the steering wheel to the right. Consider a case where the user turns the controller excessively to the left, attempting to turn left, specifically, a case where the user further turns the controller to the left from the position where the controller is tilted nearly 180° to the left (e.g., 170° to the left), resulting in a position where the controller is tilted nearly 180° to the right (e.g., 170° to the right). In this case, the following problem arises.

In such a case, since the tilt angle and the rotation angle of the steering wheel are associated with each other (in one-to-one correspondence) in Patent document 1, the user performing such an operation results in a transition of the steering wheel from a position where it is significantly tilted to the left to a position where it is significantly tilted to the right. For example, in a case where the tilt angle of the controller and the angle of rotation of the steering wheel coincide with each other, it transitions from a position where it is rotated nearly 180° to the left to a position where it is rotated nearly 180° to the right. That is, the steering wheel abruptly transitions from a position where it is fully turned to the left to a position where it is fully turned to the right. In such a case, however, the user is turning the controller excessively to the left, merely attempting to turn left, but the user does not intend to turn right. Therefore, if the game develops into a state where the steering wheel is turned to the right as described above, the user may feel awkward because such a game state is different from the user's intention. As described above, in a case where the tilt angle of the controller and the output used in the game process are associated with each other in one-to-one correspondence as in Patent document 1, the game output may be different from the user's intention, thus deteriorating the controllability of the controller.

SUMMARY OF THE INVENTION

It is therefore an object of the present invention to provide a storage medium having stored therein a game program, a game apparatus and a tilt angle correction method, with which it is possible to improve the controllability of an input device whose tilt angle is used as an input.

The present invention has the following features to attain the object mentioned above.

(1)

The present invention is directed to a computer-readable storage medium having stored therein an information processing program to be executed by a computer in an information processing device for performing a predetermined information process based on a tilt angle of an input device that can be rotated to any tilt about a predetermined axis. The information processing program causes the computer to function as angle calculation means, first determination means, and correction means. The angle calculation means calculates a tilt angle representing the tilt of the input device. The first determination means determines whether the tilt angle calculated by the angle calculation means has transitioned across a boundary at which an upper limit value and a lower limit value of the tilt angle adjoin each other. If the tilt angle has transitioned across the boundary, the correction means corrects the tilt angle used in the predetermined information process to a predetermined value that is on one side of the boundary on which the tilt angle was before crossing the boundary.

The "input device" is a concept that includes any input device that can be tilted to any angle about one direction, as well as the controller 5 used in the embodiment below.

The "information processing device" is a concept that includes a computer for performing an information process by executing any computer program, as well as the game apparatus described in the embodiment below. The "information processing device" may be of a home-console type or a portable type, and where it is a portable type device, it may include the input device and the information processing device integrated together.

The "predetermined information process" may be any process as long as it is a process in which the tilt angle is used as an input. Other than the game process of the embodiment below, the process may be a process of tilting an object in the virtual space based on the tilt angle or a process of scrolling the screen based on the tilt angle, as will be described in the (Information process) part of the [Other embodiments] section below.

The "information processing program" is a concept that includes an application program to be executed in a personal computer or a mobile terminal, as well as a game program described in the embodiment below.

The "angle calculation means" includes means for calculating the tilt angle using the calculation method described in the (Method for calculating tilt angle) part of the [Other embodiments] section below, as well as means for performing the process of step S3 in the embodiment below. The "tilt angle" represents the degree of tilting from the reference orientation, and its range between the upper limit value thereof and the lower limit value thereof is represented as a 360° range, such as, for example, a range from 0° to 360°, or a range from −180° to 180°.

If the tilt angle is represented through a 360° range as described above, the tilt angle is discontinuous across a position (the position B of FIG. 8, for example) at which the tilt angle transitions from the minimum value to the maximum value (or from the maximum value to the minimum value) (the actual tilt of the input device varies continuously). The "boundary at which an upper limit value and a lower limit value of the tilt angle adjoin each other" refers to the position at which the tilt angle is discontinuous as described above.

The "first determination means" is means for determining whether the tilt angle has transitioned across the boundary, and is a concept that includes a configuration where the determination is made by the method as defined in (2) below.

The "correction means" is a concept that includes configurations (2) to (7) in this section, as well as the means for performing the process of step S16 or S26 in the embodiment below. Note that the "predetermined value that is on one side of the boundary on which the tilt angle was before crossing the boundary" refers to a value on the side of the lower limit value in a case where the tilt angle has transitioned (across the boundary) from the side of the lower limit value to the side of the upper limit value, and to a value on the side of the upper limit value in a case where the tilt angle has transitioned (across the boundary) from the side of the upper limit value to the side of the lower limit value. Herein, the "value on the side of the upper limit value" is a value that is closer to the upper limit value than to the lower limit value, and the "value on the side of the lower limit value" is a value that is closer to the lower limit value than to the upper limit value. That is, the "predetermined value that is on one side of the boundary on which the tilt angle was before crossing the boundary" includes "a predetermined value within the first range" in (2) below, and "a predetermined value within the third range" in (7) below.

The "tilt angle used in the predetermined information process" may refer not only to a tilt angle calculated by the angle calculation means, but also to a tilt angle represented by other data in a case where the tilt angle data itself calculated by the angle calculation means is not used in the predetermined information process but the data other than the tilt angle (i.e., data representing a tilt angle that is calculated based on the tilt angle calculated by the angle calculation means, e.g., the process angle data in (13) below) is used.

With the configuration (1) above, when the tilt angle has transitioned across the boundary, the tilt angle is corrected to a value on one side of the boundary on which the tilt angle was before crossing the boundary. In such a case, it is assumed that the user has no intention of inputting the value past the boundary as the tilt angle. Therefore, if the tilt angle of the value past the boundary is used in the information process, the result of the information process will be against the user's intention. In contrast, with the configuration (1) above, the tilt angle is corrected to a value on one side of the boundary on which the tilt angle was before crossing the boundary. Therefore, even in such a case as described above, it is possible to prevent the result of the information process from being against the user's intention. Thus, it is possible to improve the controllability of an input device whose tilt angle is used as an input.

(2)

The first determination means may determine whether the tilt angle calculated by the angle calculation means has transitioned from a first range to a second range. Herein, the first range is a range from a first limit value of the tilt angle to a predetermined first angle that is closer to the first limit value than to a second limit value of the tilt angle. The second range is a range from the second limit value of the tilt angle to a predetermined second angle that is closer to the second limit value than to the first limit value. If the tilt angle has transitioned from the first range to the second range, the correction means corrects the tilt angle used in the predetermined information process to a predetermined value within the first range.

The determination of "whether the tilt angle calculated by the angle calculation means has transitioned from the first range to the second range" is a concept that includes means for making the determination by methods as follows.

Means for determining (step S11 or S21) whether the current tilt angle is within the second range, and then determining (step S13 or S23) whether the previous tilt angle is within the first range, as in the embodiment below.

Means for determining whether the previous tilt angle is within the first range, and then determining the current tilt angle is within the second range.

Means for performing another process between the determination (S11) of whether the current tilt angle is within the second range and the determination (S13) of whether the previous tilt angle is within the first range, as shown in FIG. 16.

Means for determining the transition of the tilt angle by using three or more successively calculated tilt angles.

Note that "the previous tilt angle" in the above description is a concept that includes a tilt angle that is calculated in a predetermined number of iterations before or a tilt angle that is calculated a predetermined amount of time before, as well as "the tilt angle calculated in the previous iteration" in the embodiment below.

One of the "first limit value of the tilt angle" and the "second limit value of the tilt angle" refers to the lower limit value (minimum value) of the tilt angle, and the other to the upper limit value (maximum value) of the tilt angle. Therefore, while the "first range" is the range R1 (FIG. 9) including the minimum value in the embodiment below, it may be a range including the maximum value. While the "second range" is the range R2 (FIG. 9) including the maximum value in the embodiment below, it may be a range including the minimum value.

While the "predetermined value within the first range" is the minimum value of the tilt angle in the embodiment below, it may be any value as long as it is within the first range.

With the configuration (2) above, it is possible to easily determine whether the tilt angle has transitioned across the boundary by using the first range and the second range.

(3)

The correction means may discontinue the correction of the tilt angle if the tilt angle has further transitioned out of the second range after transitioning from the first range to the second range.

Note that "to transition out of the second range" includes a case where the tilt angle transitions out of the first range and out of the second range, as well as a case where the tilt angle returns to a value within the first range.

With the configuration (3) above, the correction of the tilt angle is discontinued in a case where the tilt angle returns to a value within the first range and in a case where the tilt angle transitions out of the first range and out of the second range (if it further transitions past the second range). In the former case, the correction is no longer needed because it is assumed that the state where the user is holding the input device excessively turned has been canceled. For the latter case, it is assumed that it is normally unlikely that the user further turns the input device from a position where the input device has already been turned excessively. Therefore, in the latter case, it is assumed that the user has repositioned the hands on the input device or a transition has been made from the second range through the first range (the input device has been rotated in the same direction as that in the former case, thereby canceling the state where the user is holding the input device excessively turned), thus eliminating the need for the correction in either case.

As described above, with the configuration (3) above, the correction of the tilt angle is discontinued when it is assumed that the state where the user is holding the input device turned excessively has been canceled. While the tilt angle is corrected, the value of the tilt angle used in the information process is fixed. Therefore, if the correction continues to be performed even after canceling the state described above, the controllability of the input device will deteriorate. In contrast, with the configuration (3) above, the tilt angle is corrected only when necessary, and is not corrected when not necessary, thus further improving the controllability of the input device.

(4)

The correction means may discontinue the correction of the tilt angle when a predetermined amount of time elapses since the tilt angle transitions from the first range to the second range.

With the configuration (4) above, the correction of the tilt angle will not be performed continuously over a long period of time, and the correction is discontinued after the elapse of a predetermined amount of time. It is assumed that a state where the user is holding the input device excessively turned is unlikely to continue over a long period of time because it is an unnatural posture for the user. That is, in a case where the tilt angle transitions from the first range to the second range, and then holds the value in the second range over a long period of time, it is assumed that the user has repositioned the hands on the input device and thus there is no need for the correction. Therefore, with the configuration (4) above, it is possible to more reliably prevent the correction from being performed when not necessary, thereby further improving the controllability of the input device.

(5)

The input device may further include an operation button used for making an input in the predetermined information process. The correction means discontinues the correction of the tilt angle if the operation button is pressed while the tilt angle is within the second range.

The "operation button" is an operation button that is used as an input in the information process, and in other words, one of operation buttons of the input device that is used for an operation regarding the information process.

With the configuration (5) above, it is possible to easily determine whether the state has returned to an original state from a state where the user is holding the input device excessively turned based on whether an operation using a button has been made. Therefore, it is possible to more easily cancel the tilt angle correction, and it is possible to prevent the tilt angle correction from continuing over a long period of time as in (3) above, thus further improving the controllability of the input device.

(6)

The input device may include detection means capable of detecting at least one of a tilt and a movement status of the input device itself. The angle calculation means calculates the tilt angle based on a detection result of the detection means. The information processing program causes the computer to further function as accuracy determination means for determining whether the tilt angle calculated by the angle calculation means is accurate. The correction means corrects the tilt angle only if it is determined that the tilt angle calculated by the angle calculation means is accurate.

The "detection means" is a concept that includes a camera, gyrosensor, etc., as well as the acceleration sensor 37 described in the embodiment below.

The "accuracy determination means" is a concept that includes means for making determinations based on the amount of change in the acceleration vector, the amount of change in the marker coordinates, the magnitude of the angular velocity, etc., described in the (Condition for canceling correction state) part of the [Other embodiments] section below, as well as the means for performing the process of step S42 shown in FIG. 16.

With the configuration (6) above, the accuracy determination means determines whether the tilt angle is accurate, and the tilt angle is not corrected if the tilt angle is not accurate. Then, it is possible to prevent the correction from being performed erroneously even though the user is not holding the input device excessively turned but as a result of the calculated tilt angle being inaccurate.

(7)

The information processing program may cause the computer to further function as second determination means. The second determination means determines whether the tilt angle calculated by the angle calculation means has transitioned from a third range to a fourth range, where the third range is a range from the second limit value to a predetermined third angle that is closer to the second limit value than to the first limit value, and the fourth range is a range from the first limit value to a predetermined fourth angle that is closer to the first limit value than to the second limit value. If the tilt angle has transitioned from the third range to the fourth range, the correction means corrects the tilt angle used in the predetermined information process to a predetermined value within the third range.

With the configuration (7) above, the tilt angle can be corrected both in a case where the tilt angle abruptly transitions from a value near the minimum value to a value near the maximum value, and in a case where the tilt angle abruptly transitions from a value near the maximum value to a value near the minimum value. Therefore, it is possible to prevent the result of the information process from being against the user's intention, irrespective of the rotation direction in which the user excessively turns the input device. Thus, it is possible to further improve the controllability of the input device.

(8)

The first angle and the third angle may be equal to each other, and the second angle and the fourth angle may be equal to each other.

With the configuration (8) above, the tilt angle is corrected under the same condition whether the input device is excessively turned in one rotation direction or in the other rotation direction. Since the correction is performed equally whether the input device is tilted in one direction or the other, it is possible to further improve the controllability of the input device.

(9)

The information processing program may cause the computer to further function as game process means for performing a predetermined game process as the predetermined information process.

With the configuration (9) above, the present invention can be applied to a game program performing any game process, and it is possible to further improve the controllability of the game operation.

(10)

The game process means may calculate, based on the tilt angle, a process angle which is an angle used in the predetermined game process and whose range is narrower than that of the tilt angle.

With the configuration (10) above, it is possible to use, in the game process, an angle that is represented by a narrower range (e.g., a range from −90° to 90°) than the tilt angle, which is represented across the 360° range.

(11)

The game process means may perform a game process of controlling an orientation of an object placed in a virtual space so that the object is in an angle corresponding to the tilt angle.

With the configuration (11) above, the user can perform a game operation in which the orientation of an object in the virtual space is changed by changing the tilt of the input device.

(12)

The game process means may perform a game process of controlling a moving direction of an object placed in a virtual space based on the tilt angle.

With the configuration (12) above, the user can perform a game operation in which the moving direction of an object in the virtual space can be changed by changing the tilt of the input device.

(13)

The correction means may calculate data representing the tilt angle calculated by the angle calculation means as process angle data representing an angle used in the predetermined game process if the tilt angle has not crossed the boundary, and may calculate data representing a corrected tilt angle as the process angle data if the tilt angle calculated by the angle calculation means has crossed the boundary.

With the configuration (13) above, the process angle data is calculated separately from the tilt angle calculated by the angle calculation means. Thus, it is possible to save the calculation results of the angle calculation means, and the calculation results can be used in a process in which the process angle data is used, and in other processes.

(14)

The input device may include an acceleration sensor or a gyrosensor. The angle calculation means calculates the tilt angle based on an acceleration or angular velocity detection result detected by the acceleration sensor or the gyrosensor.

With the configuration (14) above, it is possible to easily calculate the tilt angle by using the detection result of the acceleration sensor or the gyrosensor.

The present invention may also be provided in the form of an information processing device having similar functions to those of the information processing device described above. Note that in such an information processing device, the various means may be implemented by a CPU executing the information processing program described above, or some or all of the various means may be implemented by a dedicated circuit or circuits of the information processing device. The present invention may also be implemented as a tilt angle correction method, which is the same as the method carried out by the information processing device.

As described above, according to the present invention, when the tilt angle has transitioned across the boundary, the tilt angle is corrected to a value that is on one side of the boundary on which the tilt angle was before crossing the boundary. Therefore, it is possible to prevent the tilt angle of an inappropriate value from being used in the information process, thereby improving the controllability of the input device.

These and other objects, features, aspects and advantages of the present invention will become more apparent from the following detailed description of the present invention when taken in conjunction with the accompanying drawings.

DESCRIPTION OF THE PREFERRED EMBODIMENTS

[General Configuration of Game System]

Figure 1:
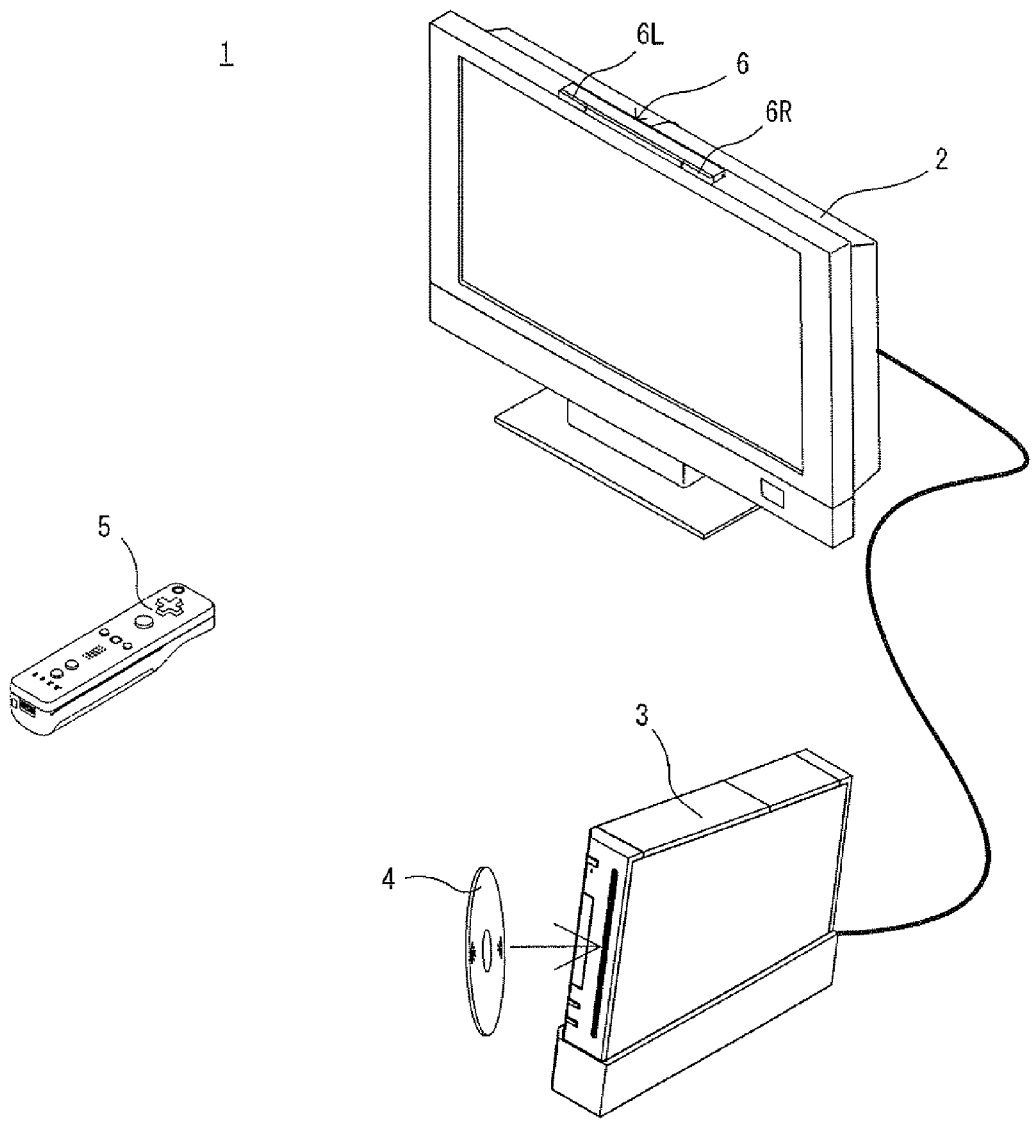
FIG. 1 is an external view of a game system.

With reference to FIG. 1, a game system 1 including a game apparatus typifying an information processing apparatus according to an embodiment of the present invention will be described. FIG. 1 is an external view of the game system 1. In the following description, a home-console type game apparatus is taken as an example for describing a game apparatus and a game program of the present embodiment. As shown in FIG. 1, the game system 1 includes a television receiver (hereinafter, simply referred to as a "television") 2, a game apparatus 3, an optical disc 4, a controller 5, and a marker section 6. In this system, the game apparatus 3 performs a game process based on a game operation using the controller 5.

In the game apparatus 3, the optical disc 4 typifying an information storage medium used for the game apparatus 3 in a replaceable manner is detachably inserted. A game program executed by the game apparatus 3 is stored in the optical disc 4. The game apparatus 3 has, on the front surface thereof, an insertion opening for the optical disc 4. The game apparatus 3 reads and executes the game program stored in the optical disc 4 which is inserted through the insertion opening, so as to perform the game process.

The game apparatus 3 is connected to the television 2, which is an exemplary display device, through a connecting cord. A game image obtained as a result of the game process performed by the game apparatus 3 is displayed on the television 2. Further, the marker section 6 is provided on the periphery (in FIG. 1, on a portion above a screen) of a screen of the television 2. The marker section 6 includes two markers 6R and 6L on both ends thereof. Specifically, the marker 6R (as well as the marker 6L) includes one or more infrared LEDs, and emits an infrared light forward from the television 2. The marker section 6 is connected to the game apparatus 3, and the game apparatus 3 is able to control each infrared LED of the marker section 6 so as to light up each infrared LED.

The controller 5 is an input device that provides the game apparatus 3 with operation data representing the content of an operation performed on the controller itself. The controller 5 and the game apparatus 3 are connected to each other by wireless communication. In the present embodiment, the wireless communication between the controller 5 and the game apparatus 3 is made using, for example, Bluetooth (Registered Trademark) technology. In another embodiment, the connection between the controller 5 and the game apparatus 3 may be a wired connection.

[Internal Configuration of Game Apparatus 3]

Figure 2:
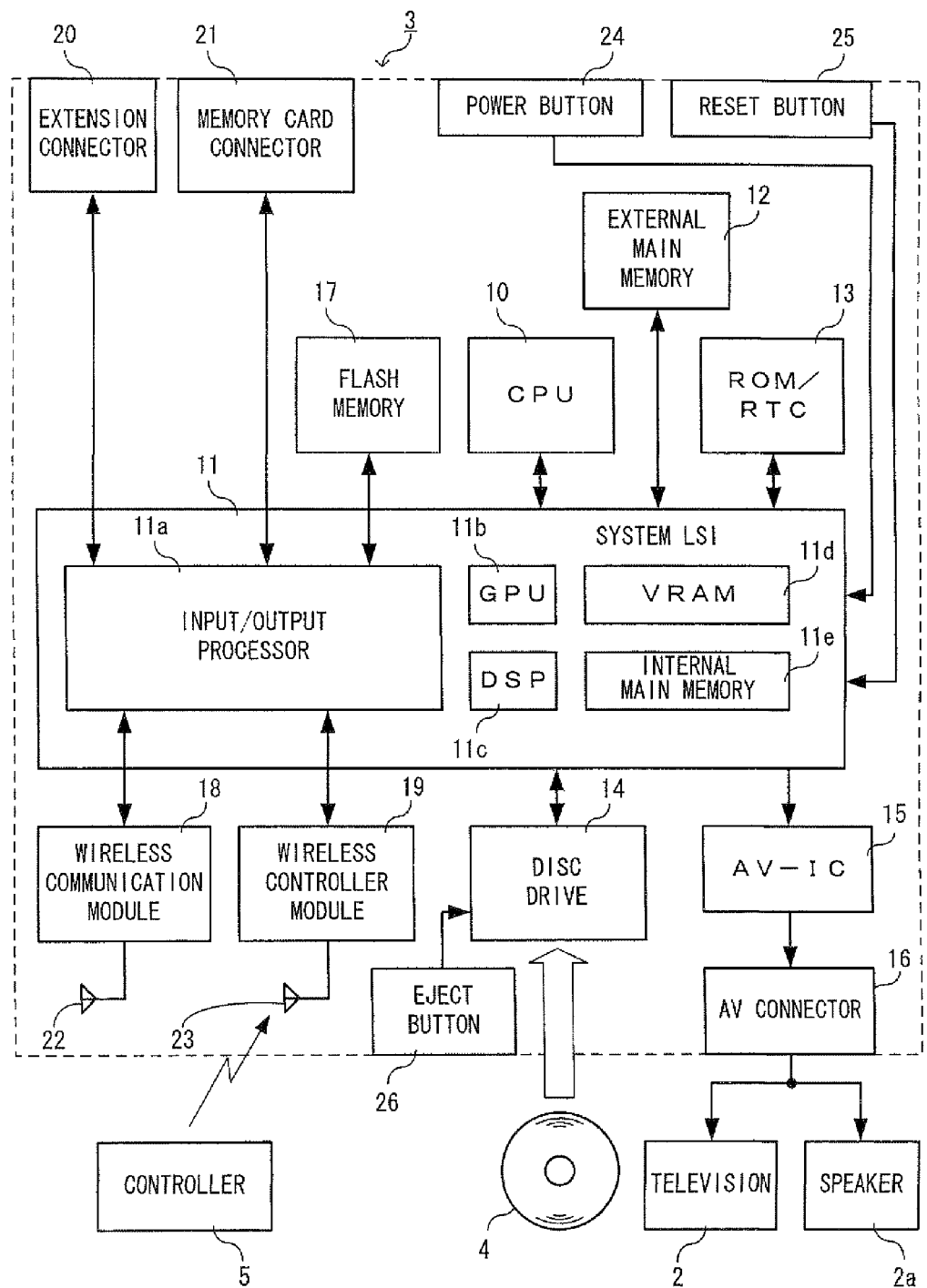
FIG. 2 is a functional block diagram of a game apparatus.

Next, an internal configuration of the game apparatus 3 will be described with reference to FIG. 2. FIG. 2 is a block diagram illustrating a configuration of the game apparatus 3. The game apparatus 3 includes a CPU 10, a system LSI 11, an external main memory 12, a ROM/RTC 13, a disc drive 14, an AV-IC 15, and the like.

The CPU 10, functioning as a game processor, performs game processes by executing the game program stored in the optical disc 4. The CPU 10 is connected to the system LSI 11. To the system LSI 11, the external main memory 12, the ROM/RTC 13, the disc drive 14, and the AV-IC 15 as well as the CPU 10 are connected. The system LSI 11 performs processes for controlling data transmission between the respective components connected thereto, generating an image to be displayed, acquiring data from an external device, and the like. The internal configuration of the system LSI will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disc drive 14 reads program data, texture data, and the like from the optical disc 4, and writes the read data into an internal main memory 11e to be described below or the external main memory 12.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The GPU 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data using data stored in the VRAM 11d.

The DSP 11c, functioning as an audio processor, generates audio data using sound data and sound waveform (tone quality) data stored in the internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the components connected thereto, and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11e regularly accesses the flash memory 17, and detects the presence or absence of any data which needs to be transmitted to the network, and when detected, transmits the data to the network through the wireless communication module 18 and the antenna 22. Further, the input/output processor 11a receives data transmitted from another game apparatus, and/or downloads data from a download server, through the network, the antenna 22, and the wireless communication module 18, and the received data and/or the downloaded data are stored to the flash memory 17. The CPU 10 executes a game program so as to read data stored in the flash memory 17 and use the data on the game program. The flash memory 17 may store saved data (game result data or intermediate-stage data) of a game played using the game apparatus 3 in addition to data transmitted from the game apparatus 3 to another game apparatus or the various servers, and data received by the game apparatus 3 from another game apparatus or the various servers.

The input/output processor 11e receives operation data transmitted from the controller 5 through the antenna 23 and the wireless controller module 19, and (temporarily) stores the received operation data to a buffer area of the internal main memory 11e or the external main memory 12.

Further, the input/output processor 11a is connected to the extension connector 20 and the memory card connector 21. The extension connector 20 is a connector for an interface, such as USE or SCSI, and allows communication with the network by connecting thereto a medium such as an external storage medium, connecting thereto another peripheral device such as a controller, and/or connecting thereto a wired communication connector, without using the wireless communication module 18. The memory card connector 21 is a connector for connecting thereto an external storage medium such as a memory card. For example, the input/output processor 11a accesses an external storage medium through the extension connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots a boot program of the game apparatus 3. The eject button 26 is connected to the disc drive 14. When the eject button 26 is pressed, the optical disc 4 is ejected from the disc drive 14.

[Configuration of Controller 5]

Figure 3:
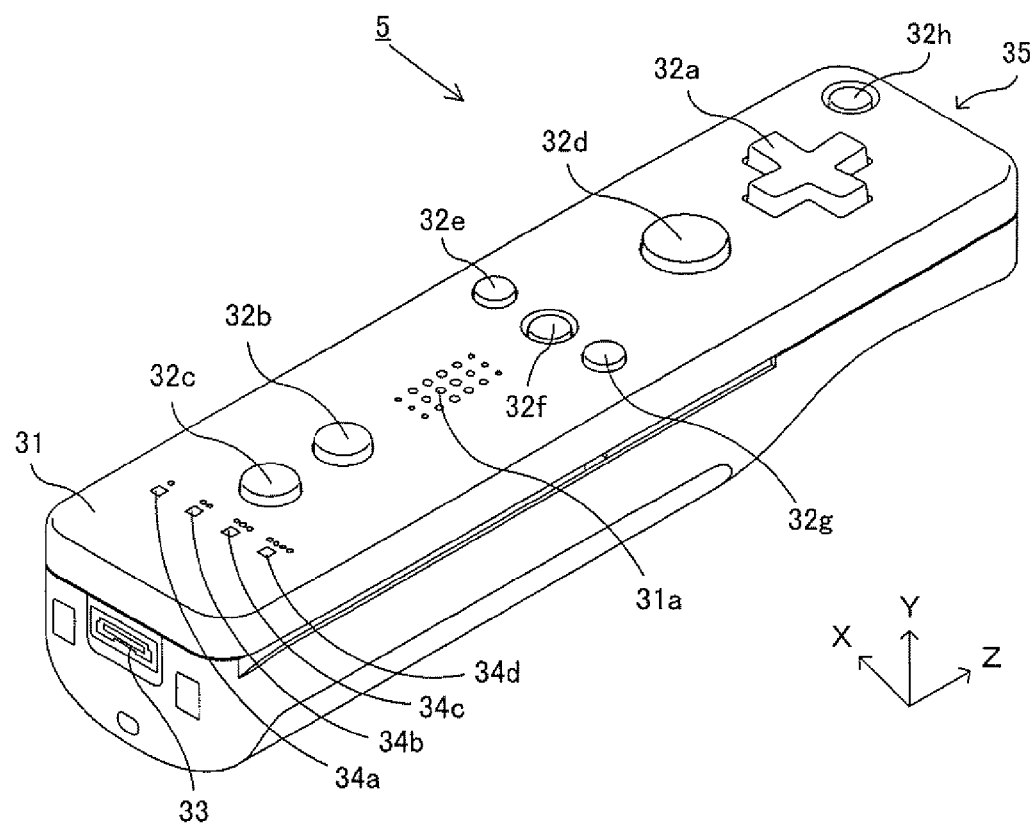
FIG. 3 is a perspective view illustrating an external configuration of an input device.
Figure 4:
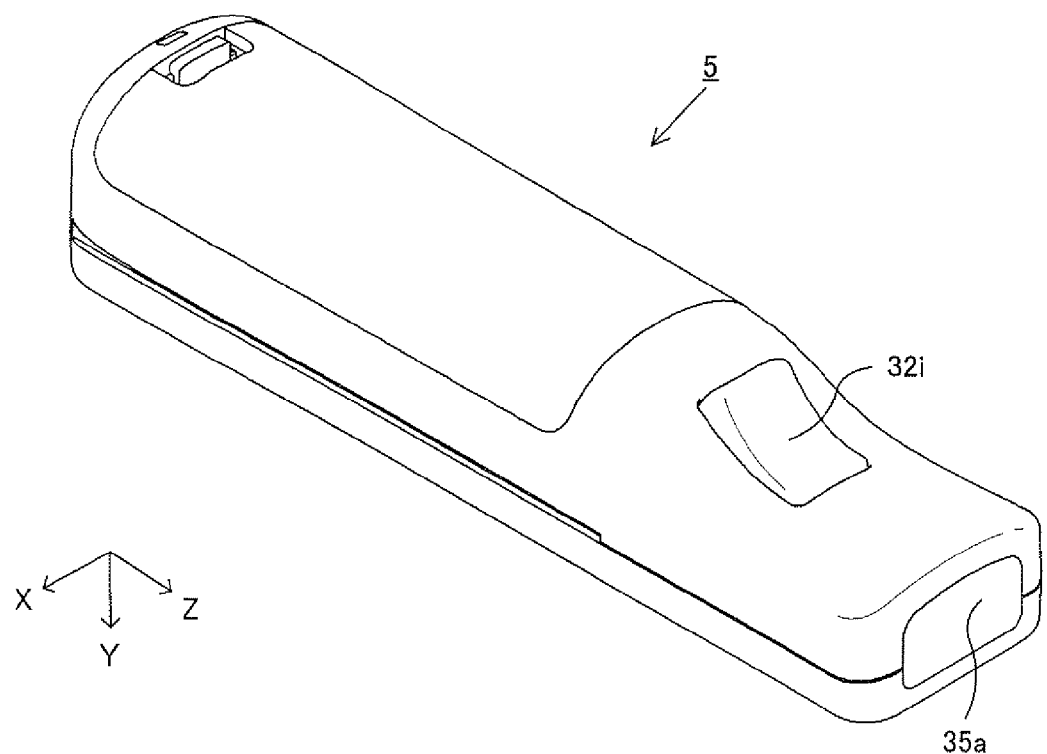
FIG. 4 is a perspective view illustrating an external configuration of a controller.

Next, with reference to FIGS. 3 to 6, the controller 5 will be described. FIG. 3 is a perspective view illustrating an external configuration of the controller 5. FIG. 4 is a perspective view illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. A player can perform game operations by pressing buttons provided on the controller 5, and moving the controller 5 to change the position and the orientation thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present invention, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the player.

On the rear surface of the housing 31, the connector 33 is provided. The connector 33 is used for connecting the controller 5 to another device. Both sides of the connector 33 on the rear surface of the housing 31 have a fastening hole 33a for preventing easy inadvertent disengagement of another device as described above.

in the rear-side portion of the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing the player of the controller type which is currently being set for the controller 5 being used, and for informing the player of remaining battery power of the controller 5, for example. Specifically, when a game operation is performed using the controller 5, one of the plurality of LEDs 34a, 34b, 34c, and 34d corresponding to the controller type is lit up.

The controller 5 has an image capturing/processing section 35 (FIG. 6), and a light incident surface 35a through which a light is incident on the image capturing/processing section 35 is provided on the front surface of the housing 31, as shown in FIG. 4. The light incident surface 35a is made of a material transmitting therethrough at least infrared light outputted from the markers 6R and 6L.

On the top surface of the housing 31, sound holes 31a for externally outputting a sound from a speaker 49 (shown in FIG. 5) incorporated in the controller 5 is provided between the first button 32b and the home button 32f.

Figure 5:
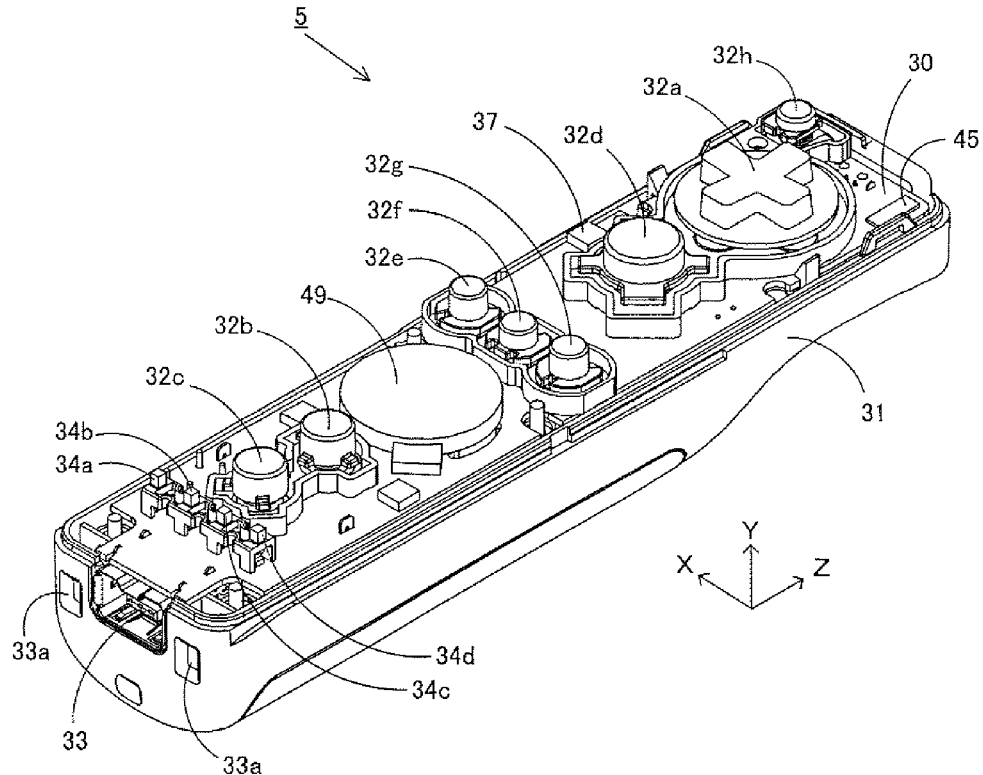
FIG. 5 is a diagram illustrating an internal structure of the controller.
Figure 6:
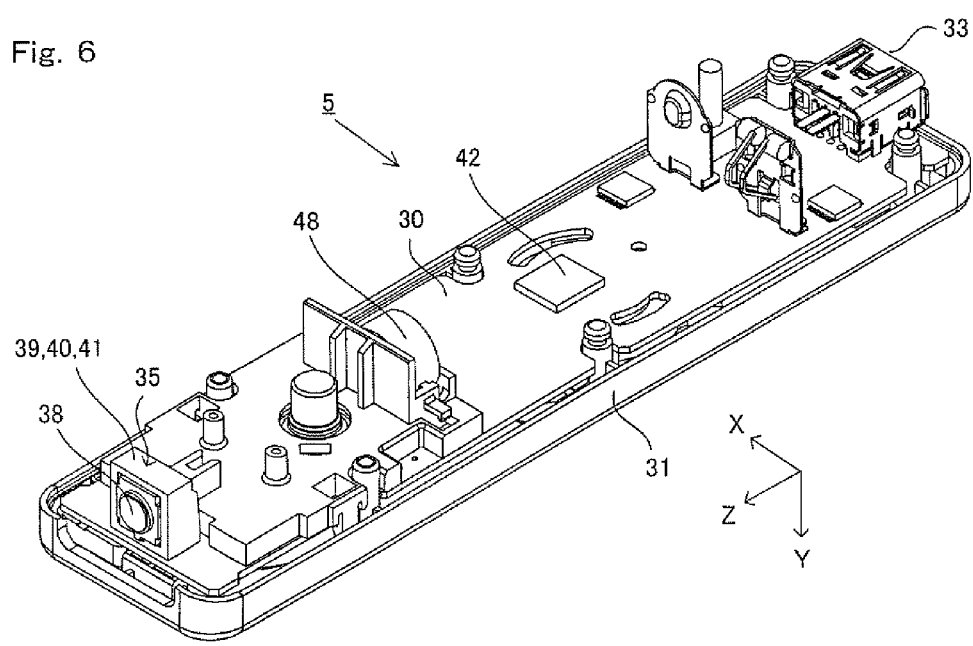
FIG. 6 is another diagram illustrating an internal structure of the controller.

Next, with reference to FIGS. 5 and 6, an internal structure of the controller 5 will be described. FIG. 3 and FIG. 6 are diagrams illustrating the internal structure of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated around the Z-axis may be facilitated. Further, the acceleration sensor 37 is provided anterior to the center of the controller 5 with respect to the longitudinal direction (Z-axis direction). Further, a wireless module 44 (FIG. 7) and the antenna 45 allow the controller 5 to act as a wireless controller.

On the other hand, as shown in FIG. 6, at a front edge of a bottom main surface of the substrate 30, the image capturing/processing section 35 is provided. The image capturing/processing section 35 includes an infrared filter 38, a lens 39, an image capturing element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by actuation of the vibrator 48 based on a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned offset from the center toward the end of the controller 5, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

The shape of each operation button, the number and the positions of acceleration sensors and vibrators, and so on, shown in FIGS. 3 to 6 are merely illustrative, and the present invention can be realized with other shapes, numbers, and positions. Further, although in the present embodiment the imaging direction of the image pickup means is the Z-axis positive direction, the imaging direction may be any direction. That is, the imagining information calculation section 35 (the light incident surface 35a through which a light is incident on the image capturing/processing section 35) of the controller 5 may not necessarily be provided on the front surface of the housing 31, but may be provided on any other surface on which a light can be received from the outside of the housing 31.

Figure 7:
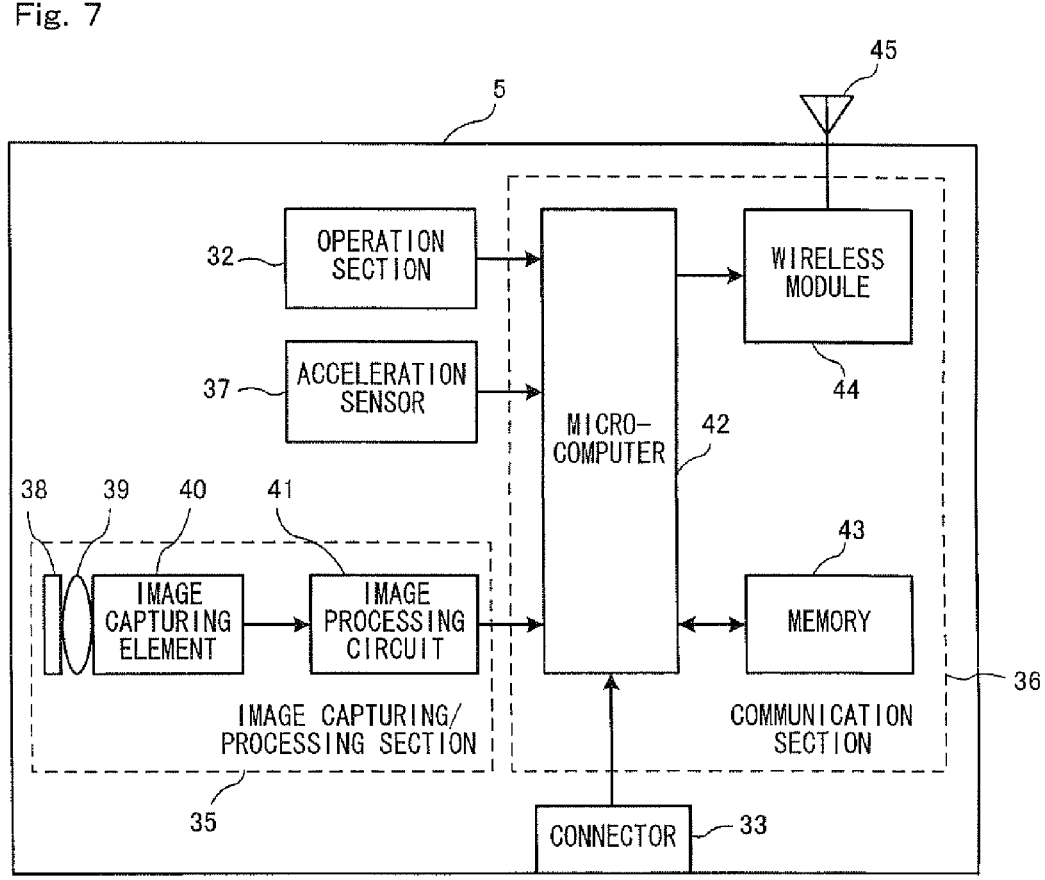
FIG. 7 is a block diagram illustrating a configuration of the input device.

FIG. 7 is a block diagram illustrating a configuration of the controller 5. The controller 5 includes an operation section 32 (the operation buttons 32a to 32i), the connector 33, the image capturing/processing section 35, a communication section 36, and the acceleration sensor 37. The controller 5 transmits, as operation data, data representing the content of an operation performed on the controller itself, to the game apparatus 3.

The operation section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The image capturing/processing section 35 is a system for analyzing image data taken by the image pickup means and calculating, for example, the centroid and the size of an area having a high brightness in the image data. The image capturing/processing section 35 has a maximum sampling period of, for example, about 200 frames/sec., and therefore can trace and analyze even a relatively fast motion of the controller 5.

The image capturing/processing section 35 includes the infrared filter 38, the lens 39, the image capturing element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image capturing element 40. The image capturing element 40 is a solid-state imaging device such as, for example, a CMOS sensor or a CCD sensor, which receives the infrared light collected by the lens 39, and outputs an image signal. The markers 6R and 6L of the marker section 6 provided near the display screen of the television 2 each include an infrared LED for outputting an infrared light forward from the television 2. Therefore, the infrared filter 38 enables the image capturing element 40 to receive only the infrared light transmitted through the infrared filter 38 and generate image data, so that an image of each of the markers 6R and 6L can be taken with enhanced accuracy. Hereinafter, the image taken by the image capturing element 40 is referred to as a captured image. The image data generated by the image capturing element 40 is processed by the image processing circuit 41. The image processing circuit 41 calculates, in the captured image, the positions of subjects to be imaged (the marker 6R and the marker 6L). The image processing circuit 41 outputs coordinates of the calculated positions, to the microcomputer 42 of the communication section 36. The data representing the coordinates is transmitted as operation data to the game apparatus 3 by the microcomputer 42. Hereinafter, the coordinates are referred to as "marker coordinates". The marker coordinates change depending on the orientation (tilt angle) and/or the position of the controller 5 itself, and therefore the game apparatus 3 is allowed to calculate the orientation and the position of the controller 5 using the marker coordinates.

In another embodiment, the controller 5 may not necessarily include the image processing circuit 41, and the controller 5 may transmit the captured image as it is to the game apparatus 3. At this time, the game apparatus 3 may have a circuit or a program, having the same function as the image processing circuit 41, for calculating the marker coordinates.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. For example, the three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects an acceleration in the straight line direction along each axis, and an output from the acceleration sensor 37 represents a value of the linear acceleration for each of the three axes. In other words, the detected acceleration is represented as a three-dimensional vector (ax, ay, az) in an XYZ-coordinate system (controller coordinate system) defined relative to the controller 5 (controller 5). Hereinafter, a vector representing components of the acceleration values detected for the three axes, respectively, by the acceleration sensor 37 is referred to as an acceleration vector.

Data (acceleration data) representing the acceleration detected by the acceleration sensor 37 is outputted to the communication section 36. The acceleration detected by the acceleration sensor 37 changes depending on the orientation (tilt angle) and the movement of the controller 5 itself, and therefore the game apparatus 3 is allowed to calculate the orientation and the movement of the controller 5 using the acceleration data. In the present embodiment, the game apparatus 3 determines the orientation (tilt angle) of the controller 5 based on the acceleration data. That is, the acceleration sensor 37 is used as a sensor for outputting data used for determining the tilt angle of the controller 5.

When a computer such as a processor (for example, the CPU 10) of the game apparatus 3 or a processor (for example, the microcomputer 42) of the controller 5 processes an acceleration signal outputted from the acceleration sensor 37, additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the tilt angle. Thus, the acceleration sensor 37 is used in combination with the processor, making it possible to determine the tilt angle or the orientation of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding tilt angle (or another preferable parameter).

Note that while an acceleration sensor of an electrostatic capacitance type, for example, is used in the present embodiment as the sensor for outputting a value varying in accordance with the movement of the controller, an acceleration sensor of another type or a gyrosensor may be used. Note however that while an acceleration sensor detects a linear acceleration along each axis, a gyrosensor detects an angular velocity entailing rotation. That is, when a gyrosensor is employed instead of an acceleration sensor, since they detect signals of different natures, they cannot be simply replaced by one another. Therefore, when calculating the orientation (tilt angle) using a gyrosensor instead of an acceleration sensor, changes as follows are made, for example. Specifically, the game apparatus 3 initializes the orientation value at the beginning of the detection. Then, angular velocity data outputted from the gyrosensor are integrated. Then, by using the result of integration, the amount of change in the orientation from the initialized orientation value is calculated. In this case, the calculated orientation is represented in angle.

As already described above, in a case where the tilt angle (orientation) is calculated by an acceleration sensor, the tilt angle is calculated by using an acceleration vector. Therefore, the calculated tilt angle can be represented by a vector, and an absolute direction can be calculated even without initialization, which represents a difference between where an acceleration sensor is used and where a gyrosensor is used. Moreover, they calculate the tilt angle in values of different natures, i.e., one being an angle and the other being a vector, as described above. Therefore, when an acceleration sensor is replaced by a gyrosensor, it is necessary to perform a predetermined conversion on the tilt angle data.

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33.

Data outputted from the operation section 32, the image capturing/processing section 35, and the acceleration sensor 37 to the microcomputer 42 are temporarily stored to the memory 43. The data are transmitted as the operation data to the game apparatus 3. At the time of the transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process. The wireless transmission from the communication section 36 to the wireless controller module 19 is sequentially performed at a predetermined time interval. Since the game process is generally performed at a cycle of 1/60 sec. (corresponding to one frame time), data is preferably transmitted at a cycle of a shorter time period. The communication section 36 of the controller 5 outputs, to the wireless controller module 19 of the game apparatus 3, the respective operation data at intervals of 1/200 seconds, for example.

When the controller 5 is used, the player can perform not only a conventionally typical game operation of pressing each operation button, but also an operation of tilting the controller 5 at a desired tilt angle. Other than these operations, the player can perform an operation of designating a desired position on the screen using the controller 5, and also can perform an operation by moving the controller 5 itself.

[Outline of Orientation Calculation Process]

Next, referring to FIGS. 8 to 12, the outline of the process for calculating the tilt angle of the controller 5 to be performed in the game apparatus 3 will be described. Note that the present embodiment will be described with respect to an example where the game apparatus 3 performs a game process for a car racing game, i.e., an example where the user performs a game operation by rotating the controller 5 as the user would operate a steering wheel of a vehicle. Specifically, the following description is directed to an example where the user performs an operation by rotating the controller 5 about the Y axis shown in FIG. 3, and the game apparatus 3 calculates the tilt angle with respect to the rotation about the Y axis.

In the present embodiment, the game apparatus 3 calculates the tilt angle θ of the controller 5 based on the acceleration (acceleration vector) detected by the acceleration sensor 37. The game apparatus 3 repeatedly calculates the tilt angle θ, at a rate of once per a predetermined amount of time. The method for calculating the tilt angle θ from the acceleration may be any method, and the calculation method of the present embodiment will be described later. The calculated tilt angle θ is represented as follows in the present embodiment.

Figure 8:
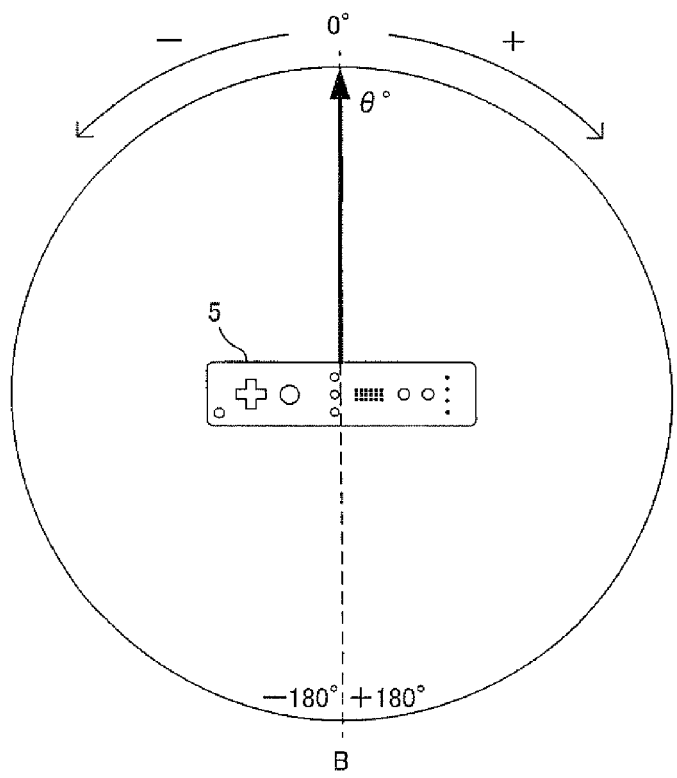
FIG. 8 is a diagram illustrating a tilt angle calculated in the present embodiment.

FIG. 8 is a diagram illustrating the tilt angle calculated in the present embodiment. As shown in FIG. 8, the tilt angle θ is represented by the direction of the controller 5 in the X-axis negative direction. Specifically, the game apparatus 3 represents the tilt angle as being 0° when the X-axis negative direction is in a predetermined reference direction (e.g., a vertically upward direction). The tilt angle θ is represented by a positive value when it is rotated to the right from the reference direction (as viewed from the side of the button surface of the controller 5), and by a negative value when it is rotated to the left. The tilt angle θ is calculated so as to be uniquely determined based on the tilt of the controller 5. That is, the tilt angle θ is represented so that there is a width of 360° from the minimum value to the maximum value. For example, the angle when the controller 5 is rotated twice from the reference angle (0°) is represented not as "720°", but as "0°". More specifically, in the present embodiment, the tilt angle θ is represented by a numerical value in the range of −180°<θ≦180° as shown in FIG. 8.

As described above, the tilt angle θ is calculated so as to be uniquely determined based on the tilt of the controller 5. While the controller 5 makes one rotation, the tilt thereof varies continuously, but the tilt angle representing the tilt is discontinuous at the point B of transition (see FIG. 8) from the minimum value to the maximum value (or from the maximum value to the minimum value). As described above, where the tilt angle θ is calculated so as to be uniquely determined based on the tilt of the controller 5, there is necessarily a point across which the value of the tilt angle θ is discontinuous. In the present specification, the point across which the tilt angle θ is discontinuous is referred to as the "boundary (of tilt angle)".

In the present embodiment, the tilt angle θ is used to determine the rotation angle of the steering wheel of the vehicle placed in the game space. The game apparatus 3 calculates the rotation angle of the steering wheel so that it increases as the tilt angle θ increases except when the correction process to be described later is performed. That is, the rotation angle of the steering wheel is calculated to be an angle corresponding to the magnitude of the tilt angle θ in the direction corresponding to whether the tilt angle θ of the controller 5 is positive or negative, except when the correction process to be described later is performed. Therefore, if the controller 5 is rotated to the left from the reference angle, the steering wheel rotates to the left by an angle corresponding to the amount of rotation, and if the controller 5 is rotated to the right from the reference angle, the steering wheel rotates to the right by an angle corresponding to the amount of rotation. Note that the game apparatus 3 determines the vehicle moving direction based on the calculated rotation angle.

Figure 9:
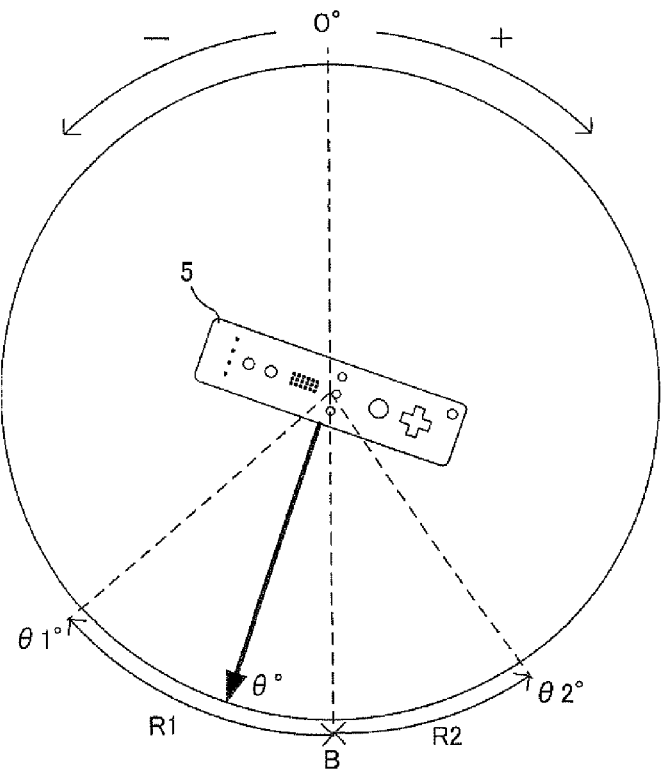
FIG. 9 is a diagram illustrating a state where the controller 5 is tilted to the left from the reference angle (0°)

FIG. 9 is a diagram illustrating a state where the controller 5 is tilted to the left from the reference angle (0°). In FIG. 9, the controller 5 is rotated nearly 180° to the left from the reference angle, and the state shown in FIG. 9 is a state where the user is attempting to significantly turn the steering wheel to the left. Herein, the range R1 "−180°<θ≦θ1°" from the possible minimum value of the tilt angle θ to a predetermined first angle θ1 is referred to as the "first range". The range R2 "θ2°≦θ≦180°" from a predetermined second angle θ2 to the possible maximum value of the tilt angle is referred to as the "second range". In FIG. 9, the tilt angle θ is slightly larger than −180°, and is included inside the first range R1.

Figure 10:
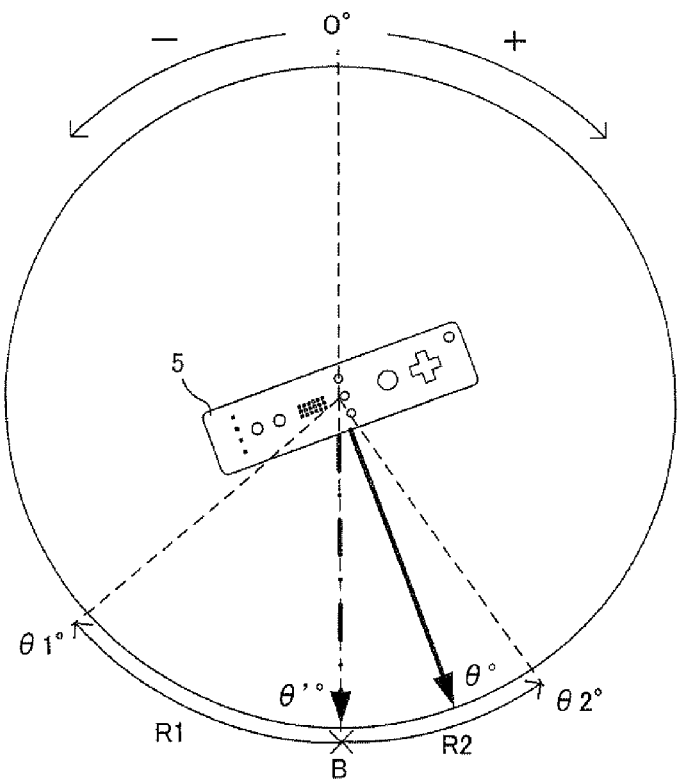
FIG. 10 is a diagram illustrating a state where the tilt angle θ has transitioned across the boundary B from the state shown in FIG. 9.

Now consider a case where the tilt angle θ of the controller 5 abruptly transitions from an angle within the first range R1 to an angle within the second range R2, i.e., a case where the tilt angle θ transitions across the boundary B. FIG. 10 is a diagram illustrating a state where the tilt angle θ transitions across the boundary B from the state shown in FIG. 9. In FIG. 10, the tilt angle θ is slightly smaller than 180°, and is included inside the second range R2.

In such a case, the tilt angle θ has a positive value. Therefore, if the game apparatus 3 calculates the rotation angle of the steering wheel using the tilt angle θ as it is, the rotation angle of the steering wheel is calculated as being a state where it is rotated to the right. In this case, however, it is assumed that the tilt angle θ has a positive value because the user turns the controller 5 excessively to the left, and the user has no intention to turn the steering wheel to the right. Therefore, if the game apparatus 3 calculates the rotation angle of the steering wheel by using the tilt angle θ as it is, the rotation angle of the steering wheel will be different from the user's intention. Since the steering wheel will actually be turned to the right despite the user attempting to turn the steering wheel to the left, the user may feel awkward about the operation.

In view of this, in the present embodiment, the game apparatus 3 performs a process of correcting the tilt angle θ in such cases as described above. Specifically, when the tilt angle θ transitions from the first range R1 to the second range R2, the game apparatus 3 corrects the tilt angle θ to an angle θ' (referred to as the "first corrected angle") within the first range R1 (see (FIG. 10). Note that the first corrected angle θ' is, for example, the smallest value within the first range R1 (e.g., θ'=−179° in a case where the tilt angle θ is represented by an integer).

In a case where the correction process described above is performed, the game apparatus 3 calculates the rotation angle of the steering wheel using the corrected tilt angle θ'. Therefore, in the present embodiment, even if the controller 5 is tilted to the right as a result of turning it excessively to the left, the steering wheel will not be turned to the right against the user's intention, and it is thus possible to improve the controllability of the controller 5 without the user feeling awkward about the game result.

Note that in the present embodiment, the game apparatus 3 performs the correction process described above when the tilt angle, which is calculated continuously, transitions from the first range R1 to the second range R2. In a case where the tilt angle θ transitions to a positive value from a negative value that is greater than the first range R1, the correction process is not performed. This is because it is assumed in such a case that the tilt angle θ transitions across the reference angle (0°), but not across the boundary B. Note that the widths of the first range R1 and the second range R2 (the values of the first angle θ1 and the second angle θ2) may be determined appropriately depending on the characteristic of the acceleration sensor 37, the contents of the game, the possible ways of holding the controller 5, etc.

In the present embodiment, the game apparatus 3 performs the tilt angle correction process while the tilt angle θ continues to stay within the second range R2 after the tilt angle θ transitions from the first range R1 to the second range R2. Then, when the tilt angle θ transitions out of the second range R2, the correction process is ended. That is, when the tilt angle θ transitions from within the second range R2 to a region where the tilt angle θ is negative, it is assumed that the user has returned the controller 5 to the original state from a state where it is turned excessively to the left. Therefore, in such a case, the game apparatus 3 ends the correction process. When the tilt angle θ transitions from within the second range R2 to a region where the tilt angle θ is positive, the tilt angle θ is substantially past the boundary B, and it is unlikely that the user is turning the controller 5 excessively to the left. Therefore, in such a case, it is assumed that the controller 5 is tilted to the right for such a reason as the user having repositioned the hands on the controller 5. Therefore, also in this case, the game apparatus 3 ends the correction process.

As described above, in the present embodiment, the correction process is continued while the tilt angle θ is within the second range R2, but the correction process is ended when the tilt angle θ transitions out of the second range R2. Since the rotation angle of the steering wheel is fixed in a state where the correction process is performed (correction state), the user cannot perform a game operation if the correction state cannot be ended. In the present embodiment, even if a correction state is entered, the correction state can easily be canceled by the user returning the controller 5 to a normal tilt.

Figure 11:
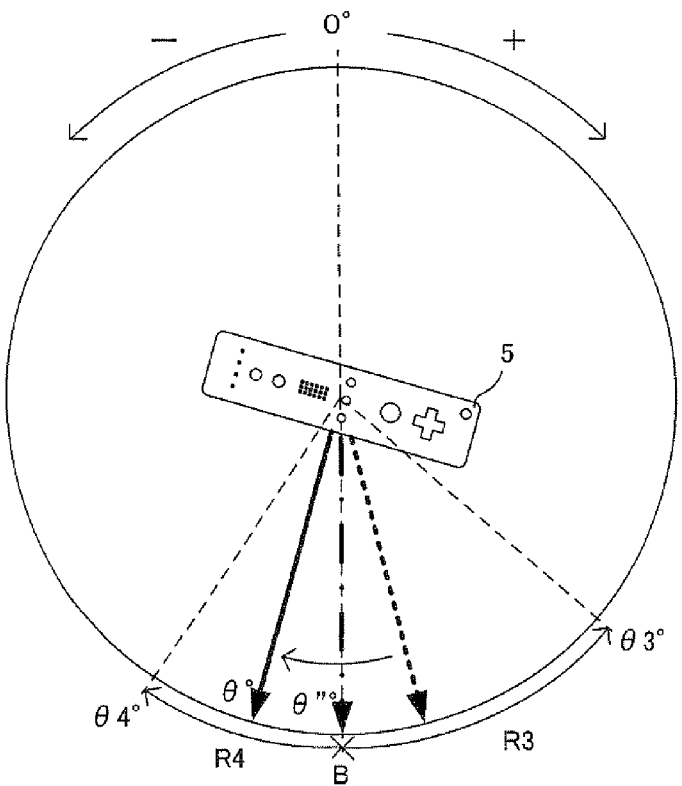
FIG. 11 is a diagram illustrating a state where the tilt angle θ has transitioned across the boundary B from a positive value to a negative value.

In FIGS. 9 and 10, the game apparatus 3 performs the correction process when the tilt angle θ transitions across the boundary B from a negative value (strictly, a value within the first range R1) to a positive value (strictly, a value within the second range R2). The game apparatus 3 performs the correction process also when the tilt angle θ transitions across the boundary B from a positive value to a negative value. FIG. 11 is a diagram illustrating a state where the tilt angle θ transitions across the boundary B from a positive value to a negative value. As shown in FIG. 11, the range R3 "θ3°≦θ≦180°" from a predetermined third angle (θ3) to the possible maximum value of the tilt angle θ is referred to as the "third range", and the range R4 "−180°<θ≦θ4°" from the possible minimum value of the tilt angle θ to a predetermined fourth angle θ4 is referred to as the "fourth range". Then, when the tilt angle θ transitions from the third range R3 to the fourth range R4, the game apparatus 3 corrects the tilt angle θ to an angle θ" (referred to as the "second corrected angle") within the third range R3 (see FIG. 11). Note that the second corrected angle θ" is, for example, the maximum value (180°) within the third range R3.

As described above, in the present embodiment, the correction process is performed both when the tilt angle θ transitions from the first range R1 to the second range R2 and when the tilt angle θ transitions from the third range R3 to the fourth range R4. Therefore, whether the user turns the controller 5 excessively to the right or excessively to the left, the rotation angle of the steering wheel will not be an angle against the user's intention. Note that in the present embodiment, in order to maintain the left-right symmetry, the widths of the first range R1 and the third range R3 are set to an equal value, and the widths of the second range R2 and the fourth range R4 are set to an equal value. Note however that in other embodiments, the left and right ranges may have asymmetric widths, or the correction may be performed either when the tilt angle θ transitions from the first range R1 to the second range R2 or when the tilt angle θ transitions from the third range R3 to the fourth range R4, depending on the contents of the game, the possible ways of holding the controller 5, etc.

[Details of Process Performed by Game Apparatus 3]

Figure 12:
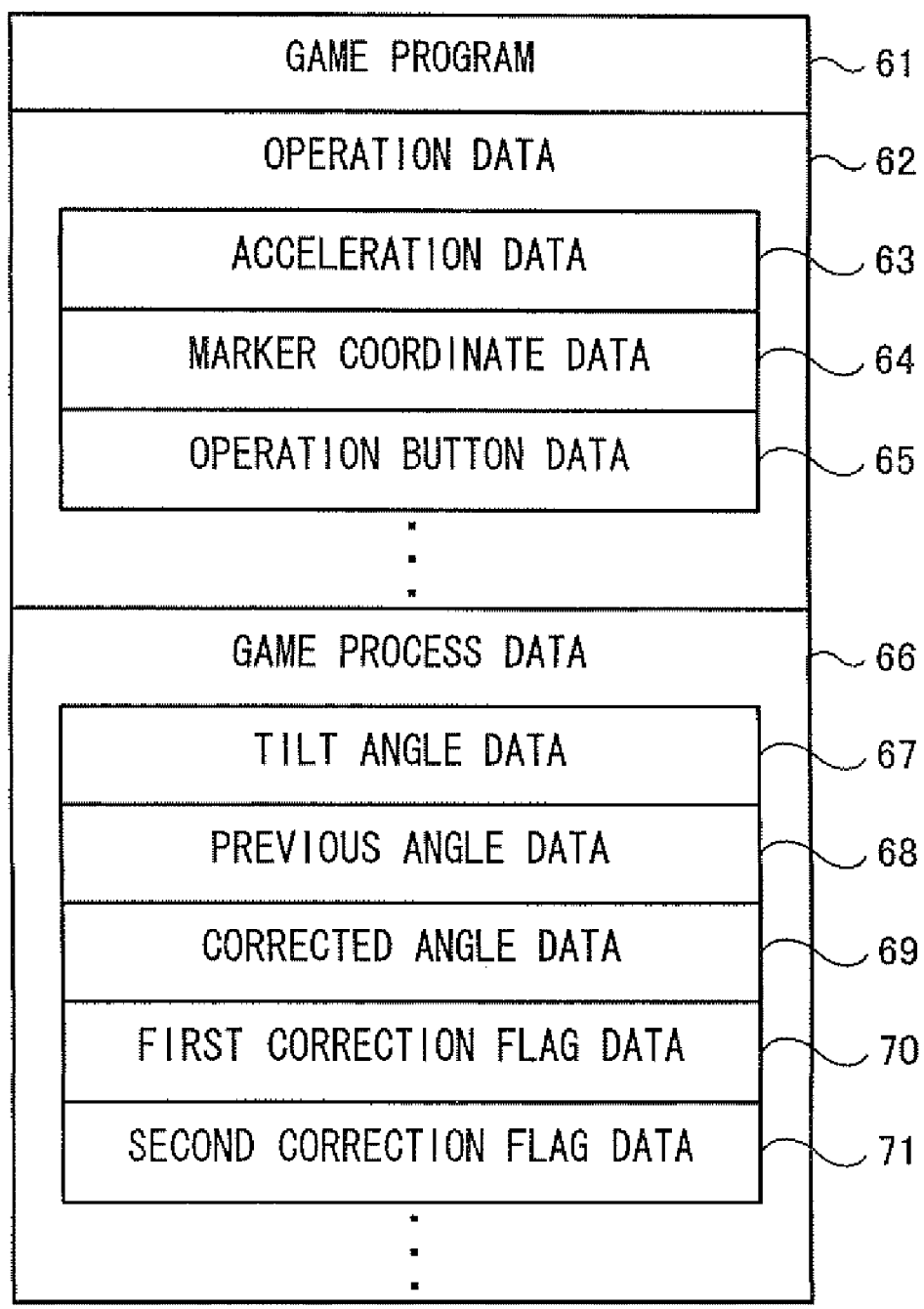
FIG. 12 is a diagram illustrating important data stored in a main memory of a game apparatus 3.

Next, details of the process performed by the game apparatus 3 will be described. First, important data to be used in the process performed by the game apparatus 3 will be described with reference to FIG. 12. FIG. 12 is a diagram illustrating important data stored in a main memory (the external main memory 12 or the internal main memory 11e) of the game apparatus 3. As shown in FIG. 12, the main memory of the game apparatus 3 stores a game program 61, operation data 62 and game process data 66. Note that in addition to those shown in FIG. 12, the main memory also stores other data necessary for the game process, such as image data of various objects appearing in the game, and data representing various parameters of the objects.

At an appropriate point in time after the power of the game apparatus 3 is turned ON, part or whole of the game program 61 is loaded from the optical disc 4 and stored in the main memory. The game program 61 includes a program for calculating the tilt angle of the controller 5, and a program for performing the game process using the calculated tilt angle.

The operation data 62 is operation data transmitted from the controller 5 to the game apparatus 3. As described above, since the operation data is transmitted at a rate of once per 1/200 sec from the controller 5 to the game apparatus 3, the operation data 62 stored in the main memory is updated at this rate. The operation data 62 includes acceleration data 63, marker coordinate data 64, and operation button data 65.

The acceleration data 63 is data representing the acceleration (acceleration vector) detected by the acceleration sensor 37. Herein, the acceleration data 63 represents a three-dimensional acceleration vector, each component of which is the acceleration in the direction of one of the three, X, Y and Z axes, shown in FIG. 3. In the present embodiment, the magnitude of the acceleration vector detected by the acceleration sensor 37 while the controller 5 is being stationary is "1". That is, the magnitude of the gravitational acceleration detected by the acceleration sensor 37 is "1".

The marker coordinate data 64 is data representing the coordinates calculated by the image processing circuit 41 of the image capturing/processing section 35, i.e., the marker coordinates described above. The marker coordinates are expressed in a two-dimensional coordinate system for representing positions on the plane corresponding to the captured image. Note that if the two markers 6R and 6L are captured by the image capturing element 40, two sets of marker coordinates are calculated. If one of the markers 6R and 6L is not located within the range that can be captured by the image capturing element 40, only one marker is captured by the image capturing element 40, and only one set of marker coordinates is calculated. If neither of the markers 6R and 6L is located within the range that can be captured by the image capturing element 40, no marker is captured by the image capturing element 40, and no marker coordinates are calculated. Thus, the marker coordinate data 64 may represent two sets of marker coordinates, represent one set of marker coordinates, or indicate that there are no marker coordinates.

The operation button data 65 is data representing the input status of each of the operation buttons 32a to 32i.

Figure 13:
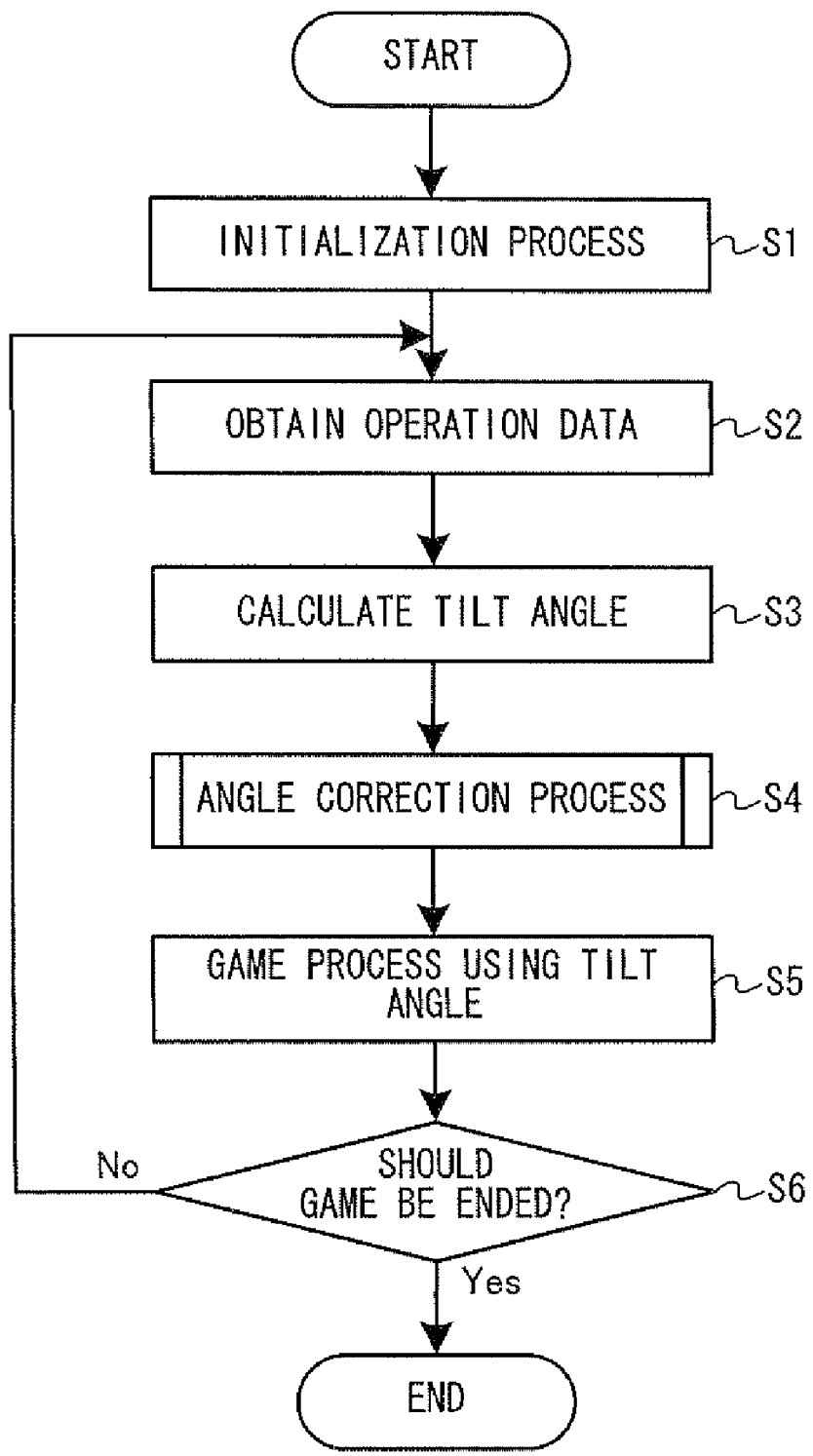
FIG. 13 is a main flow chart showing a flow of a process performed by the game apparatus 3.

The game process data 66 is data used in the game process to be described later (FIG. 13). The game process data 66 includes tilt angle data 67, previous angle data 68, corrected angle data 69, first correction flag data 70, and second correction flag data 71. Note that in addition to those shown in FIG. 12, the game process data 66 includes various other data used in the game process (e.g., data representing the game parameters).

The tilt angle data 67 is data representing the tilt angle of the controller 5. Specifically, the tilt angle data 67 represents the tilt angle θ with respect to the rotation of the controller 5 about the Y axis. The tilt angle data 67 is calculated, based on the obtained acceleration data 63, each time the acceleration data 63 is obtained.

The previous angle data 68 is previously-calculated tilt angle data. That is, when tilt angle data is newly calculated, the tilt angle data 67, which has been stored in the main memory, is then stored in the main memory as the previous angle data 68. The previous angle data 68 is used in the process (steps S11 and S13 or steps S21 and S23) of determining whether the tilt angle has transitioned from the first range R1 to the second range R2 (or from the third range R3 to the fourth range R4).

The corrected angle data 69 represents the tilt angle after being corrected by the correction process described above. Since the corrected tilt angle is the first corrected angle θ' or the second corrected angle θ" in the present embodiment, the corrected angle data 69 represents either one of the corrected angles. When the correction process is performed, the corrected angle data 69, instead of the tilt angle data 67, is used in the process (step S5) of calculating the rotation angle of the steering wheel.

The first correction flag data 70 is data representing the value of the first correction flag. The second correction flag data 71 is data representing the value of the second correction flag. Each correction flag represents whether the tilt angle correction process is being performed (correction state). Specifically, the first correction flag is set to be ON if the correction process of correcting the tilt angle θ to the first corrected angle θ' is being performed, and the first correction flag is reset to be OFF if the correction process is not being performed. The second correction flag is set to be ON if the correction process of correcting the tilt angle θ to the second corrected angle θ" is being performed, and the second correction flag is reset to be OFF if the correction process is not being performed.

Next, the process performed by the game apparatus 3 will be described in detail with reference to FIGS. 13 and 14. FIG. 13 is a main flow chart showing a flow of the process performed by the game apparatus 3. When the game apparatus 3 is powered on, the CPU 10 of the game apparatus 3 executes a boot program stored in a boot ROM not shown, so as to initialize each unit, including the main memory. The game program stored in the optical disc 4 is loaded to the main memory, and the CPU 10 starts executing the game program. The flow chart of FIG. 13 illustrates a process performed when the processes described above are completed.

First, in step S1, the CPU 10 performs an initialization process for the game. In this initialization process, the previous angle data 68, the first correction flag data 70 and the second correction flag data 71 are initialized. That is, data representing θ=0° is stored in the main memory as the previous angle data 68, and data representing OFF is stored in the main memory as the first correction flag data 70 and the second correction flag data 71. In step S1, the tilt angle data 67 and the corrected angle data 69 are not stored in the main memory. In addition, the initialization process of step S1 initializes values of various parameters used in the game process, constructs a virtual game space, and places the player object (herein, the object of the vehicle controlled by the user) and other objects at their initial positions in the game space. After step S1 described above, the process loop through steps S2 to S6 is repeatedly performed while the game is performed. Note that one iteration of the process loop is performed at a rate of once per one frame period (e.g., 1/60 sec).

In step S2, the CPU 10 acquires operation data. Specifically, operation data transmitted from the controller 5 is received via the wireless controller module 19. Then, acceleration data, marker coordinate data, operation button data, included in the received operation data are stored to the main memory. Following step S2, the process of step S3 is performed.

In step S3, the CPU 10 calculates the tilt angle θ of the controller 5. The tilt angle θ is calculated based on the acceleration vector detected by the acceleration sensor 37. The method for calculating the tilt angle θ using the acceleration vector may be any method. For example, the tilt angle with respect to the rotation about the Y axis can be calculated by using a two-dimensional vector composed of the X component and the Z component of the acceleration vector. That is, the two-dimensional vector represents the direction of gravity (when the controller 5 is stationary or substantially stationary). Thus, the orientation of the controller 5 with respect to the direction of gravity, i.e., the tilt angle, can be calculated based on the two-dimensional vector. Data representing the tilt angle calculated in step S3 is stored in the main memory as the tilt angle data 67. The data, which has been stored in the main memory as the tilt angle data, is then stored in the main memory as the previous angle data 68. Following step S3, the process of step S4 is performed.

Note that while the CPU 10 calculates the tilt angle with respect to the rotation about the Y axis using the X component and the Z component of the acceleration vector in step S3, it may calculate the tilt angle by the following method in other embodiments. That is, the CPU 10 calculates a vector obtained by projecting a three-dimensional acceleration vector onto a plane (X+Y=0) that contains the Z axis and forms an angle of 45° with the X axis and the Y axis in an XYZ-coordinate system. Then, the angle representing the direction of the calculated vector (on the plane defined above) is used as the tilt angle. Where it is assumed that the player operates the controller 5 while holding the front end portion of the controller 5 with the left hand and the rear end portion with the right hand, the thumbs in contact with the button surface of the controller 5, it is assumed that the plane defined above is parallel to the vertical direction, and it is therefore possible to accurately calculate the tilt angle by the method described above.

In step S4, the CPU 10 performs an angle correction process The angle correction process is a process for correcting the tilt angle when the tilt angle calculated in step S3 transitions across the boundary. Referring now to FIG. 14, the details of the angle correction process will be described.

Figure 14:
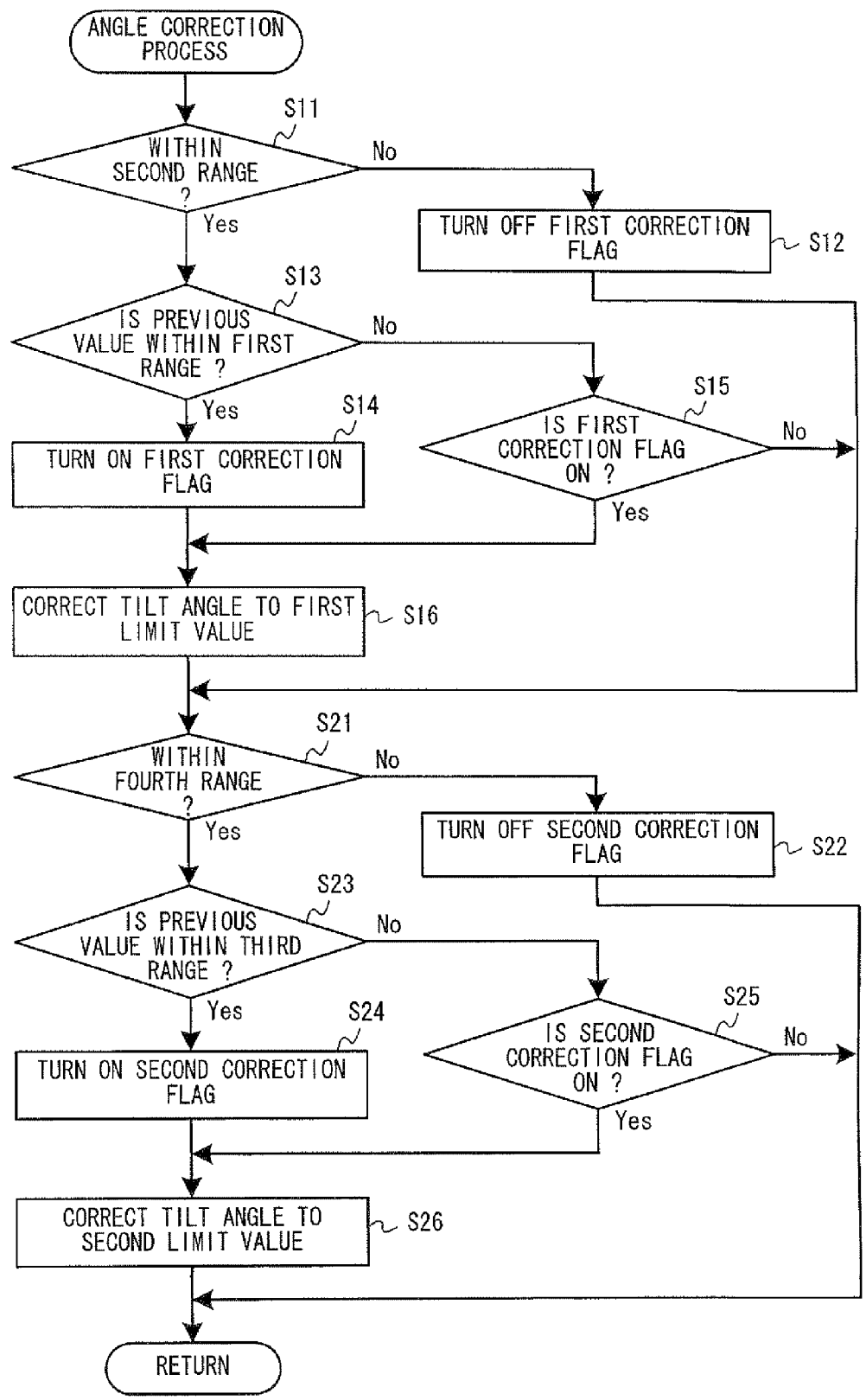
FIG. 14 is a flow chart showing a flow of an angle correction process (step S4) shown in FIG. 13.

FIG. 14 is a flow chart showing the flow of the angle correction process (step S4) shown in FIG. 13. In the angle correction process, the CPU 10 performs a correction for when the tilt angle θ transitions from the first range R1 to the second range R2 in the process through steps S11 to S16, and performs a correction for when the tilt angle θ transitions from the third range R3 to the fourth range R4 in the process through steps S21 to S26.

In step S11, the CPU 10 determines whether the tilt angle calculated in step S3 is within the second range R2. That is the CPU 10 reads out the tilt angle data 67 from the main memory, and determines whether the tilt angle θ is within the range of θ2°≦θ≦180°. If the determination result from step S11 is affirmative, the process of step S13 to be described later is performed. If the determination result from step S11 is negative, the process of step S12 is performed.

In step S12, the CPU 10 resets the first correction flag to be OFF. That is, the value of the first correction flag data 70 stored in the main memory is updated so that the flag is OFF. As described above, if the tilt angle θ is not within the second range R2 (No in step S11), the CPU 10 resets the first correction flag to be OFF since the CPU 10 will not then perform the correction process. Note that if the first correction flag data 70 already has a value representing OFF, the CPU 10 may not update the first correction flag data 70 in step S12. After step S12, the process of step S21 to be described later is performed.

In step S13, the CPU 10 determines whether the previous tilt angle is within the first range R1. The "previous tilt angle" refers to the tilt angle calculated in the previous iteration of the process loop through steps S2 to S6, and is represented by the previous angle data 68. That is, the CPU 10 reads out the previous angle data 68 from the main memory, and determines whether the previous tilt angle is within the range of "−180°<θ≦θ1°". If the determination result from step S13 is affirmative, the process of step S14 is performed. If the determination result from step S13 is negative, the process of step S15 is performed.

In step S14, the CPU 10 sets the first correction flag to be ON. That is, the value of the first correction flag data 70 stored in the main memory is updated so that the flag is ON. Thus, when the determination results from step S11 and step S13 are both affirmative, i.e., when the tilt angle θ has transitioned from within the first range R1 into the second range R2, the first correction flag is set to be ON. After step S14, the process of step S16 to be described later is performed.

In step S15, the CPU 10 determines whether the first correction flag is ON. That is, it reads out the first correction flag data 70 from the main memory and determines whether the first correction flag data 70 represents ON or OFF. If the determination result from step S15 is affirmative, the process of step S16 is performed. If the determination result from step S15 is negative, the process of step S21 to be described later is performed.

In step S16, the CPU 10 corrects the tilt angle to the first corrected angle θ'. That is, data representing the first corrected angle θ' is stored in the main memory as the corrected angle data 69. After step S16, the process of step S21 to be described later is performed.

In the present embodiment, as described above with respect to the process through steps S11 to S16, if the tilt angle θ transitions from within the first range R1 to within the second range R2 (Yes in steps S11 and S13), the first correction flag is turned ON (step S14), and the tilt angle θ is corrected (step S16). Thereafter, if the tilt angle θ is present within the second range R2 (Yes in step S11, No in step S13), since the first correction flag is ON, the determination result from step S15 is affirmative, and the tilt angle θ is corrected (step S16). Moreover, if the tilt angle θ moves out of the second range R2 (No in step S11), the first correction flag is turned OFF, and the correction process (step S16) is not performed. That is, the correction state is canceled in response to the tilt angle θ moving out of the second range R2. Note that if the tilt angle θ transitions from a value other than the first range R1 to within the second range R2, the correction process is not performed because the determination result from step S11 is affirmative, the determination result from step S13 is negative, and the determination result from step S15 is negative.

After steps S11 to S16, the process through steps S21 to S26 is performed. The process through steps S11 to S16 is a correction process performed when the tilt angle θ transitions from within the first range R1 to within the second range R2, whereas the process through steps S21 to S26 is a correction process performed when the tilt angle θ transitions from within the third range R3 to within the fourth range R4.

The process through steps S21 to S26 is similar to the process through steps S11 to S16 except that the first range R1 is changed to the third range R3, the second range R2 to the fourth range R4, and the first correction flag to the second correction flag. That is, in step S21, the CPU 10 determines whether the tilt angle θ calculated in step S3 is within the fourth range R4. If the determination result from step S21 is negative, the CPU 10 resets the second correction flag to be OFF in step S22, and ends the angle correction process. If the determination result from step S21 is affirmative, the CPU 10 determines in step 323 whether the previous tilt angle is within the third range R3. If the determination result from step S23 is affirmative, the CPU 10 sets the second correction flag to be ON in step S24, and corrects the tilt angle to the second corrected angle θ" in step S26. If the determination result from step S23 is negative, the CPU 10 determines in step S25 whether the second correction flag is ON. If the determination result from step S25 is affirmative, the tilt angle is corrected to the second corrected angle θ" in step S26, and if the determination result from step S25 is negative, the angle correction process is ended.

By the process through steps S21 to S26 described above, the tilt angle θ is corrected to the second corrected angle θ" if the tilt angle θ transitions from within the third range R3 to within the fourth range R4. Thereafter, the tilt angle θ continues to be corrected while the tilt angle θ is present within the fourth range R4. When the tilt angle θ moves out of the fourth range R4, the correction is discontinued, and the correction state is canceled. The angle correction process of the present embodiment is as described above.

Referring back to FIG. 13, in step S5, following step S4, the CPU 10 performs a game process using the tilt angle. The tilt angle used in the game process is the corrected tilt angle as represented by the corrected angle data 69 if the tilt angle is corrected in the angle correction process (step S4) and is the tilt angle as represented by the tilt angle data 67 if the tilt angle is not corrected. The game process is a game process for a car racing game in the present embodiment. Specifically, the game process includes a process of calculating the rotation angle of the steering wheel based on the tilt angle θ, and a process of calculating the vehicle moving direction using the rotation angle of the steering wheel. Note that in the process of calculating the rotation angle of the steering wheel, the CPU 10 may calculate the rotation angle so that the value of the tilt angle θ coincides with the value of the rotation angle. Alternatively, the CPU 10 may calculate the rotation angle over a range (e.g., the range from −90° to 90°) that is narrower than the range (−180°<θ≦180°) of possible values of the tilt angle θ, in such a manner that when the absolute value of the tilt angle θ is greater than or equal to a predetermined value (e.g., 90°), the rotation angle is equal to the predetermined value. In the process of calculating the vehicle moving direction, the CPU 10 may calculate the moving direction using information such as the vehicle speed or how much the accelerator is being stepped on, in addition to the rotation angle of the steering wheel. Following step S5, the process of step S6 is performed.

In step S6, the CPU 10 determines whether the game should be ended. The determination of step S6 is made based on, for example, whether the game has been cleared, the game has been over, the player has given an instruction to quit the game, etc. If the determination result from step S6 is negative, the process of step S2 is performed again. The process loop through steps S2 to S6 is repeatedly performed until it is determined in step S6 that the game should be ended. If the determination result from step S6 is affirmative, the CPU 10 ends the game process shown in FIG. 13. The game process is as described above.

As described above, in the present embodiment, when the controller 5 is tilted across the boundary B, the tilt angle θ is corrected to a value that does not exceed the boundary B. Therefore, since the tilt angle used in the game process will not transition across the boundary B, the steering wheel will not abruptly transition from a position where it is fully turned to the left to a position where it is fully turned to the right, for example, and it is possible to prevent the game from developing into a state that is not intended by the user. Thus, according to the present embodiment, it is possible to improve the controllability in the operation of tilting the controller 5.

Other Embodiments

Note that the above embodiment is an example of how the present invention can be carried out, and the present invention may also be carried out with a configuration as follows in other embodiments.

(Input Device)

The above embodiment has been described with respect to the game apparatus 3, as an example, which uses the controller 5 to be held by the user, as an example of an input device that can be rotated to any tilt. In other embodiments, the input device does not have to be an input device that can be tilted to any angle in every direction, such as the controller 5 of the above embodiment, but may be an input device that can be tilted to any angle only in a predetermined direction.

(Information Process)

In the above embodiment, the information process (game process) performed using the tilt angle is a process of calculating the rotation angle of the steering wheel of the vehicle (in the game space) to be controlled by the user, based on the tilt angle. In other embodiments, the information process may be any process as long as it is a process of obtaining any process results using the tilt angle. For example, the game process may be a process of varying the orientation of the object placed in the game space based on the tilt angle. Specifically, the game apparatus 3 may control the orientation of an airplane object flying in the game space based on the tilt angle. Since the tilt angle is also reflected in the vehicle moving direction to be determined based on the rotation angle of the steering wheel in the above embodiment, it can also be said that the game process is a process of controlling the vehicle moving direction based on the tilt angle. That is, the game process may be a process of controlling the moving direction of an object placed in the virtual space based on the tilt angle. Alternatively, the game process may be a process of scrolling the game screen based on the tilt angle, for example. Specifically, the game apparatus 3 may scroll the game screen in one of different directions depending on whether the tilt angle is positive or negative at a speed based on the absolute value of the tilt angle.

(Method for Calculating Tilt Angle)

The above embodiment has been described with respect to an example where the tilt angle is calculated based on the acceleration vector detected by the acceleration sensor 37. In other embodiments, the method for calculating the tilt angle may be any method, and the game apparatus 3 may calculate the tilt angle based on detection results from other detection means instead of, or in addition to, the acceleration sensor 37. For example, in other embodiments, the tilt angle may be calculated by using a gyrosensor described above instead of the acceleration sensor 37, or the tilt angle may be calculated by using a camera (e.g., the image capturing element 40). When the controller 5 includes a gyrosensor, the game apparatus 3 may calculate the tilt angle of the input device based on the angular velocity, which is the detection result from the gyrosensor. Where a camera is used, the game apparatus 3 detects a predetermined image (an image of the markers 6R and 6L in the above embodiment), from among images captured by the camera, at a rate of once per a predetermined amount of time. The tilt angle can be calculated by calculating the angle of rotation of the controller 5 based on the change in the predetermined image detected.

In the above embodiment, the game apparatus 3 calculates only the tilt angle with respect to the rotation about a predetermined axis (the Y axis), and uses only the tilt angle in the game process. In other embodiments, the game apparatus 3 may calculate tilt angles with respect to rotations about two or more axes, and use the tilt angles in the game process. In such a case, the present invention can be used in the individual process of calculating each of the tilt angles.

(Condition for Canceling Correction State)

In the above embodiment, the condition for canceling the correction state is that "the tilt angle takes a value outside the second range (or the fourth range)". In other embodiments, the game apparatus 3 may use the following conditions as the canceling condition, instead of, or in addition to, the above condition.

When a predetermined amount of time elapses since entering the correction state.

When a button operation is performed by the user.

When it is assumed that the tilt angle is not accurate.

The process where the above conditions are used as the canceling condition will now be described.

Figure 15:
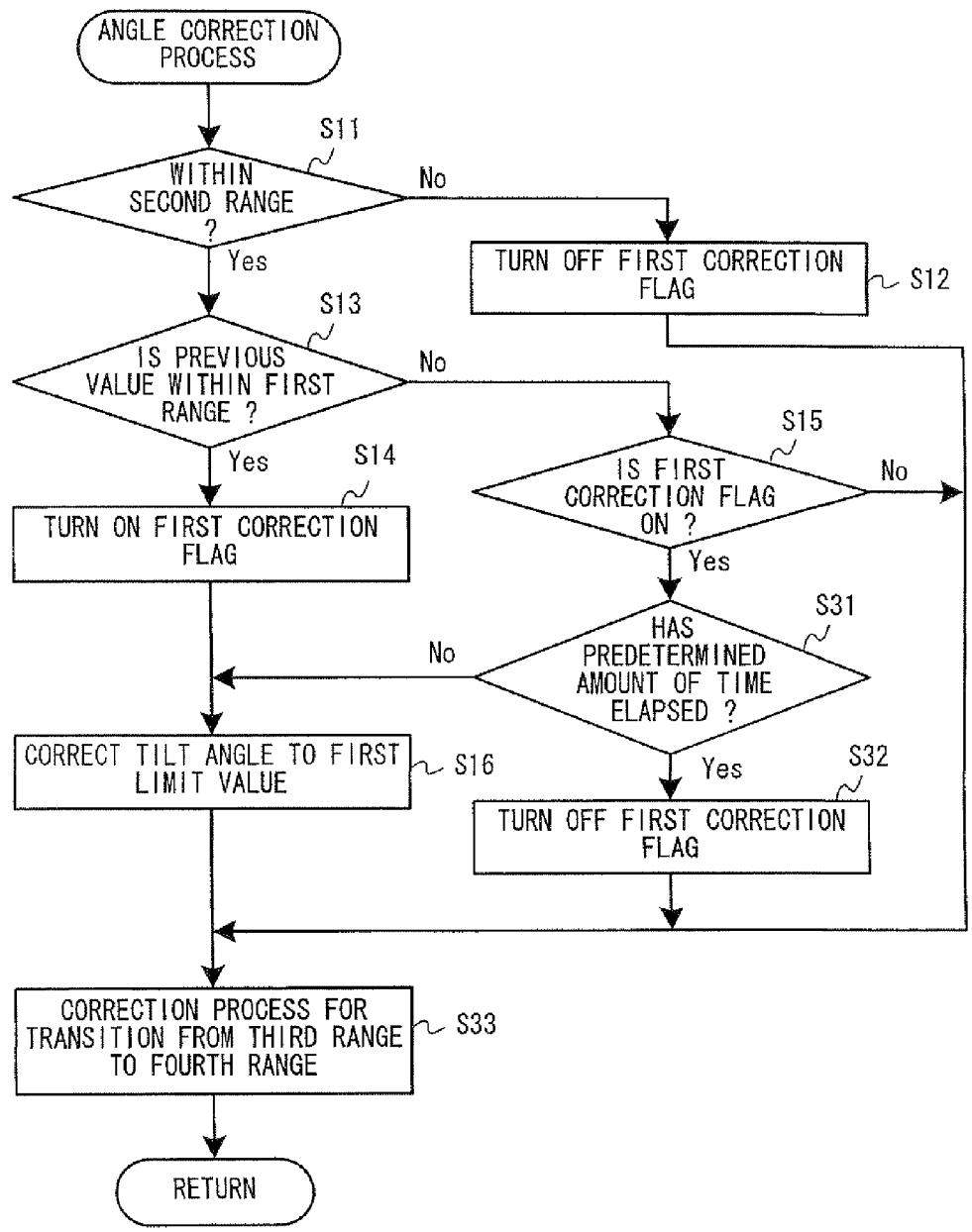
FIG. 15 is a flow chart showing a flow of an angle correction process in another embodiment.

FIG. 15 is a flow chart showing a flow of an angle correction process in another embodiment. Note that in FIG. 15, steps representing the same processes as those shown in FIG. 14 are given the same step numbers as those of FIG. 14, and will not be described in detail.

In the angle correction process shown in FIG. 15, if the determination result from step S15 is affirmative, the process of step S31 is performed. In step S31, the CPU 10 determines whether a predetermined amount of time has elapsed since entering the correction state. Note that the amount of time elapsed since entering the correction state can be obtained by measuring the amount of time elapsed since the first correction flag is turned ON (step 314). The predetermined amount of time may be a predetermined fixed value, may be determined based on the contents of the game or the status of the game, or may be set by the user. If the determination result from step S31 is affirmative, the process of step S32 is performed. If the determination result from step S31 is negative, the process of step S16 is performed.

In step S32, the CPU 10 resets the first correction flag be OFF. This cancels the correction state. Note that the process of step S32 is the same as the process of step S12 described above. After step S32, the CPU 10 performs the process of step S33 to be described later. At this time, the correction process of step S16 is not performed.

In step S33, the CPU 10 performs a correction process performed when the tilt angle θ transitions from within the third range R3 to within the fourth range R4. The process of step S33 is similar to those of steps S11 to S16, S31 and S32 shown in FIG. 15, except that the first range R1 is changed to the third range R3, the second range R2 to the fourth range R4, and the first correction flag to the second correction flag. After step S33, the CPU 10 ends the angle correction process shown in FIG. 15.

As described above, in the angle correction process shown in FIG. 15, even if the tilt angle θ stays within the second range R2 (Yes in step S15) after transitioning from the first range R1 to the second range R2, the correction process for the tilt angle θ (step S16) is not performed and the correction state is canceled (step S32) when a predetermined amount of time elapses since entering the correction state (Yes in step S31).

It is assumed that such a state where the user holds the controller 5 excessively turned past the boundary B will not typically continue for a long time. Therefore, in the angle correction process above, if the correction state lasts longer than a predetermined amount of time, the game apparatus 3 cancels the correction state, assuming that it is not a state where the user is holding the controller 5 excessively turned. Then, the correction state can be canceled in a case where the correction state is entered even though the user is not holding the controller 5 excessively turned but as a result of an inaccurate calculation of the tilt angle θ.

In other embodiments, the CPU 10 may determine in step S31 whether a predetermined button of the controller 5 has been pressed. That is, the CPU 10 reads out the operation button data 65 from the main memory, and determines whether the predetermined button has been pressed. While the predetermined button may be any button, it is preferably a button used for making an input instruction of some kind in the game process currently performed. More specifically, the predetermined button is preferably a button that is assumed to be not pressed by the user in such a state where the controller 5 is excessively turned past the boundary B. For example, in a racing game in the above embodiment, it is assumed that a button for an instruction to abruptly accelerate the vehicle is likely to be pressed when the steering wheel is not turned substantially but is unlikely to be pressed when the steering wheel is turned substantially. Therefore, the game apparatus 3 may use such a button as the predetermined button. Also with the operation above, as with the angle correction process shown in FIG. 15, the correction state can be canceled in a case where the correction state is entered even though the user is not holding the controller 5 excessively turned but as a result of an inaccurate calculation of the tilt angle θ.

Figure 16:
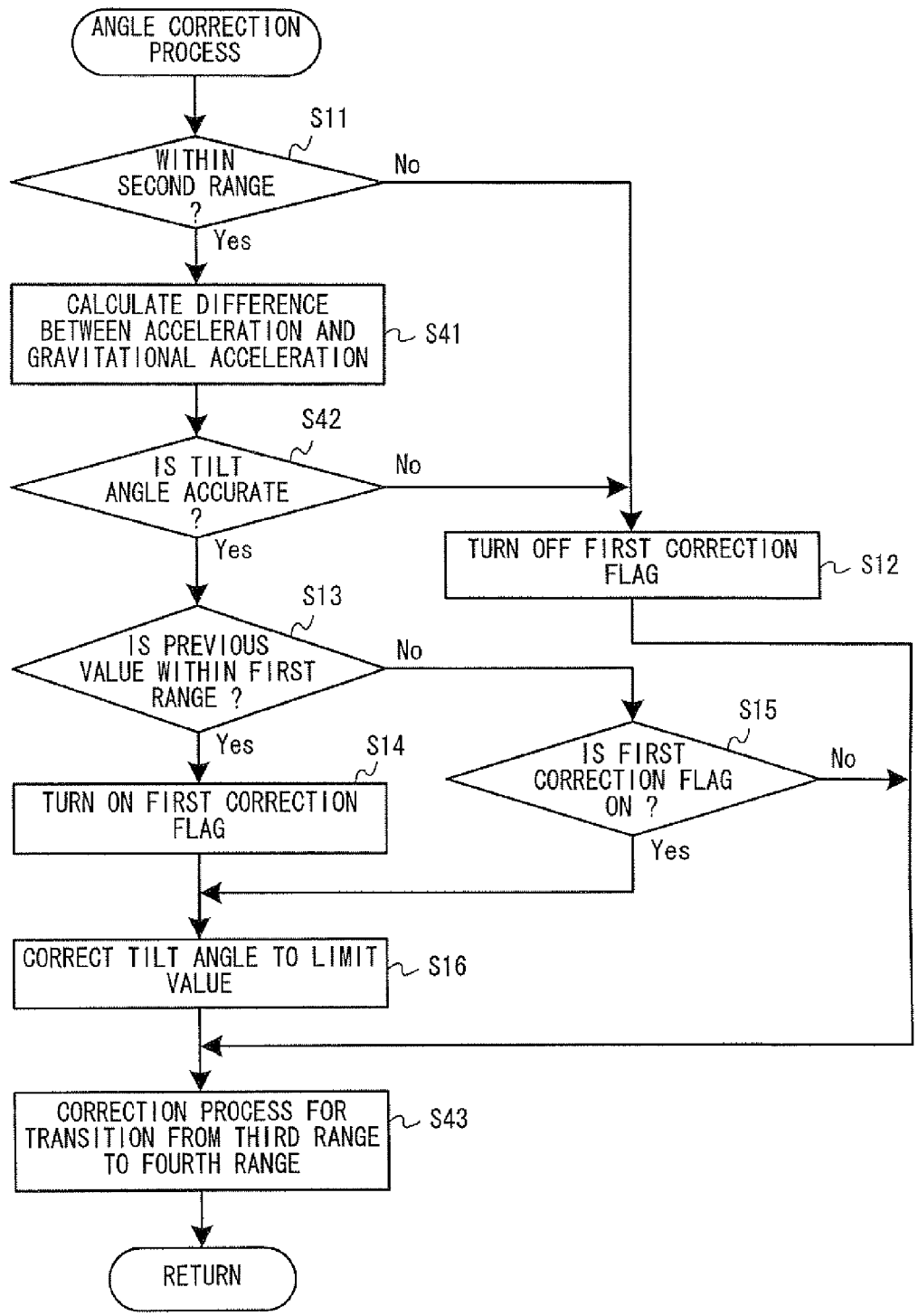
FIG. 16 is a flow chart showing a flow of an angle correction process in another embodiment.

FIG. 16 is a flow chart showing a flow of an angle correction process in another embodiment. Note that in FIG. 16, steps representing the same processes as those shown in FIG. 14 are given the same step numbers as those of FIG. 14, and will not be described in detail.

In the angle correction process shown in FIG. 16, if the determination result from step S11 is affirmative, the process of step S41 is performed. In step S41, the CPU 10 calculates the difference between the acceleration (acceleration vector) detected by the acceleration sensor 37 and the gravitational acceleration. Specifically, the CPU 10 reads out the acceleration data 63 from the main memory, and calculates the magnitude of the acceleration vector to calculate the difference between the magnitude of the acceleration vector and the magnitude of the gravitational acceleration (=1). Following step S41, the process of step S42 is performed.

In step S42, the CPU 10 determines whether the tilt angle θ calculated based on the acceleration vector is accurate (whether the tilt angle θ accurately represents the tilt of the controller 5). When the controller 5 is stationary or substantially stationary, only the gravitational acceleration is included in the acceleration detected by the acceleration sensor 37, and it is therefore possible to accurately calculate the tilt angle θ based on the acceleration. When the controller 5 is being moved by the player, the acceleration sensor 37 detects not only the gravitational acceleration, but also an acceleration caused by the movement of the controller 5. For example, the acceleration detected by the acceleration sensor 37 includes an acceleration caused by an inertial force such as a centrifugal force. Therefore, when the controller 5 is moving, it is not possible to accurately determine the direction of gravity by using the output of the acceleration sensor 37 as it is, and it may not be possible to accurately calculate the tilt angle θ. The determination process of step S42 is a process of determining whether the tilt angle θ is being calculated accurately based on whether the acceleration vector is accurately representing the direction of gravity.

It is believed that the greater the difference is between the acceleration vector and the gravitational acceleration calculated in step S41, the more violently the controller 5 is being moved and more unlikely it is that the tilt angle θ is calculated accurately. Therefore, in step S42, the CPU 10 determines whether the tilt angle is accurate based on whether the difference calculated in step S41 is smaller than a predetermined value. If the determination result from step S42 is affirmative, the process of step S13 is performed. If the determination result from step S42 is negative, the process of step S12 is performed.

In step S43, the CPU 10 performs a correction process performed when the tilt angle θ transitions from within the third range R3 to within the fourth range R4. The process of step S43 is similar to those of steps S11 to S16, S41 and S42 shown in FIG. 16, except that the first range R1 is changed to the third range R3, the second range R2 to the fourth range R4, and the first correction flag to the second correction flag. After step S43, the CPU 10 ends the angle correction process shown in FIG. 16.

As described above, in the angle correction process shown in FIG. 16, the tilt angle correction process (step S16) is performed under the condition that the tilt angle θ is determined to be accurate (Yes in step S42). Therefore, the correction state can be canceled in a case where the correction state is entered even though the user is not holding the controller 5 excessively turned but as a result of the tilt angle θ being inaccurate.

Note that in the angle correction process shown in FIG. 16, the game apparatus 3 determines whether the tilt angle θ is accurate based on the difference between the acceleration vector and the gravitational acceleration. The determination can also be made based on the amount of change in the acceleration vector, the amount of change in the marker coordinates, and (where the controller 5 includes a gyrosensor) the magnitude of the angular velocity detected by the gyrosensor, etc.

The present invention is applicable to, for example, a game program or a game apparatus, aiming at, for example, improving the controllability of an input device whose tilt angle is used as an input.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an information processing program to be executed by a computer in an information processing device for performing a predetermined information process based on a tilt angle of an input device that can be rotated to any tilt about a predetermined axis, the information processing program comprising instructions causing the computer to:
calculate a tilt angle representing the tilt of the input device;
determine whether the calculated tilt angle has transitioned across a boundary at which an upper limit value and a lower limit value of the tilt angle adjoin each other; and
if the tilt angle has transitioned across the boundary, correct the tilt angle used in the predetermined information process to a predetermined value that is on one side of the boundary on which the tilt angle was before crossing the boundary, wherein:
the determination of whether the calculated tilt angle has transitioned across a boundary determines whether the calculated tilt angle has transitioned from a first range to a second range, where the first range is a range from a first limit value of the tilt angle to a predetermined first angle that is closer to the first limit value than to a second limit value of the tilt angle, and the second range is a range from the second limit value of the tilt angle to a predetermined second angle that is closer to the second limit value than to the first limit value; and
if the tilt angle has transitioned from the first range to the second range, the correction corrects the tilt angle used in the predetermined information process to a predetermined value within the first range.

2. The storage medium according to claim 1, wherein the correction discontinues the correction of the tilt angle if the tilt angle has further transitioned out of the second range after transitioning from the first range to the second range.

3. The storage medium according to claim 1, wherein the correction discontinues the correction of the tilt angle when a predetermined amount of time elapses since the tilt angle transitions from the first range to the second range.

4. The storage medium according to claim 1, wherein:
the input device further includes an operation button used for making an input in the predetermined information process; and
the correction discontinues the correction of the tilt angle if the operation button is pressed while the tilt angle is within the second range.

5. The storage medium according to claim 1, wherein:
the input device is structured to detect at least one of a tilt and a movement status of the input device itself;
the angle calculation calculates the tilt angle based on a detection result of the detection;
the information processing program includes further instructions that cause the computer to determine whether the tilt angle calculated by the angle calculation is accurate; and
the correction corrects the tilt angle only if it is determined that the tilt angle calculated by the angle calculation is accurate.

6. The storage medium according to claim 1, wherein:
the information processing program includes further instructions that cause the computer to determine whether the tilt angle calculated by the angle calculation has transitioned from a third range to a fourth range, where the third range is a range from the second limit value to a predetermined third angle that is closer to the second limit value than to the first limit value, and the fourth range is a range from the first limit value to a predetermined fourth angle that is closer to the first limit value than to the second limit value; and
if the tilt angle has transitioned from the third range to the fourth range, the correction corrects the tilt angle used in the predetermined information process to a predetermined value within the third range.

7. The storage medium according to claim 6, wherein the first angle and the third angle are equal to each other, and the second angle and the fourth angle are equal to each other.

8. The storage medium according to claim 1, wherein the information processing program further includes instructions that cause the computer to perform a predetermined game process as the predetermined information process.

9. The storage medium according to claim 8, wherein the game process calculates, based on the tilt angle, a process angle which is an angle used in the predetermined game process and whose range is narrower than that of the tilt angle.

10. The storage medium according to claim 8, wherein the game process performs a game process of controlling an orientation of an object placed in a virtual space so that the object is in an angle corresponding to the tilt angle.

11. The storage medium according to claim 8, wherein the game process performs a game process of controlling a moving direction of an object placed in a virtual space based on the tilt angle.

12. The storage medium according to claim 8, wherein the correction calculates data representing the tilt angle calculated by the angle calculation as process angle data representing an angle used in the predetermined game process if the tilt angle has not crossed the boundary, and calculates data representing a corrected tilt angle as the process angle data if the tilt angle calculated by the angle calculation crossed the boundary.

13. The storage medium according to claim 1, wherein:
the input device includes an acceleration sensor or a gyrosensor; and
the angle calculation calculates the tilt angle based on an acceleration or angular velocity detection result detected by the acceleration sensor or the gyrosensor.

14. An information processing device for performing a predetermined information process based on a tilt angle of an input device that can be rotated to any tilt about a predetermined axis, the information processing device comprising:
an angle calculator structured to calculate a tilt angle representing the tilt of the input device;
a processor structured to determine whether the tilt angle calculated by the angle calculator has transitioned across a boundary at which an upper limit value and a lower limit value of the tilt angle adjoin each other;
the processor being further structured to, if the tilt angle has transitioned across the boundary, correct the tilt angle used in the predetermined information process to a predetermined value that is on one side of the boundary on which the tilt angle was before crossing the boundary, wherein
the processor is structured to determine whether the calculated tilt angle has transitioned across a boundary by determining whether the calculated tilt angle has transitioned from a first range to a second range, where the first range is a range from a first limit value of the tilt angle to a predetermined first angle that is closer to the first limit value than to a second limit value of the tilt angle, and the second range is a range from the second limit value of the tilt angle to a predetermined second angle that is closer to the second limit value than to the first limit value, and if the tilt angle has transitioned from the first range to the second range, corrects the tilt angle used in the predetermined information process to a predetermined value within the first range.

15. A tilt angle correction method for performing a predetermined information process based on a tilt angle of an input device that can be rotated to any tilt about a predetermined axis, the correction method comprising:
using a processor, automatically calculating a tilt angle representing the tilt of the input device;
using the processor, automatically determining whether the tilt angle calculated in the angle calculation has transitioned across a boundary at which an upper limit value and a lower limit value of the tilt angle adjoin each other; and
if the tilt angle has transitioned across the boundary, correcting, using the processor, the tilt angle used in the predetermined information process to a predetermined value that is on one side of the boundary on which the tilt angle was before crossing the boundary,
the determining includes determining whether the calculated tilt angle has transitioned from a first range to a second range, where the first range is a range from a first limit value of the tilt angle to a predetermined first angle that is closer to the first limit value than to a second limit value of the tilt angle, and the second range is a range from the second limit value of the tilt angle to a predetermined second angle that is closer to the second limit value than to the first limit value, and
the correcting includes, if the tilt angle has transitioned from the first range to the second range, correcting the tilt angle used in the predetermined information process to a predetermined value within the first range.

16. An information processing device for performing a predetermined information process based on a tilt angle of an input device that can be rotated to any tilt about a predetermined axis, the information processing device configured to:
calculate a tilt angle representing the tilt of the input device;
determine whether the tilt angle calculated by the angle calculation has transitioned across a boundary at which an upper limit value and a lower limit value of the tilt angle adjoin each other, including determining whether the calculated tilt angle has transitioned from a first range to a second range, where the first range is a range from a first limit value of the tilt angle to a predetermined first angle that is closer to the first limit value than to a second limit value of the tilt angle, and the second range is a range from the second limit value of the tilt angle to a predetermined second angle that is closer to the second limit value than to the first limit value; and
if the tilt angle has transitioned from the first range to the second range across the boundary, correcting the tilt angle used in the predetermined information process to a predetermined value within the first range.

17. An information processing system comprising:
a handheld input device that can be rotated in free space to any tilt about an axis, the handheld input device comprising at least one inertial sensor that produces an output signal responsive to tilt of the handheld input device;
a processor connected to receive the inertial sensor output signal, the processor being configured to calculate, in response to the inertial sensor output signal, a tilt angle representing the tilt of the input device, to determine whether the calculated tilt angle has transitioned across a boundary at which an upper limit value and a lower limit value of the tilt angle adjoin each other including determining whether the calculated tilt angle has transitioned from a first range to a second range, where the first range is a range from a first limit value of the tilt angle to a predetermined first angle that is closer to the first limit value than to a second limit value of the tilt angle, and the second range is a range from the second limit value of the tilt angle to a predetermined second angle that is closer to the second limit value than to the first limit value, and if the tilt angle has transitioned from the first range to the second range across the boundary, to correct the calculated tilt angle to a value that is on one side of the boundary on which the tilt angle was before crossing the boundary by correcting the tilt angle used in the predetermined information process to a predetermined value within the first range; and
an image generator coupled to the processor, the image generator generating an animated image of an object which tracks the corrected tilt angle.

18. An information processing system comprising:
a handheld input device that can be rotated in free space to any orientation, the handheld input device comprising at least one inertial sensor that produces an output signal responsive to orientation and/or change of orientation of the handheld input device;
a processor connected to receive the inertial sensor output signal, the processor being configured to calculate, in response to the inertial sensor output signal, an orientation value representing an orientation of the input device, to determine whether the calculated orientation value has transitioned across a boundary at which an upper limit value and a lower limit value of the orientation value adjoin each other, including determining whether the calculated tilt angle has transitioned from a first range to a second range, where the first range is a range from a first limit value of the tilt angle to a predetermined first angle that is closer to the first limit value than to a second limit value of the tilt angle, and the second range is a range from the second limit value of the tilt angle to a predetermined second angle that is closer to the second limit value than to the first limit value; and if the calculated orientation value is determined to have transitioned from the first range to the second range across the boundary, to correct the calculated orientation value to a value that is on one side of the boundary on which orientation value was before crossing the boundary by correcting the tilt angle used in the predetermined information process to a predetermined value within the first range; and
an image generator coupled to the processor, the image generator generating an animated image of an object responsive to the corrected orientation value.

19. A non-transitory computer-readable storage medium having stored therein an information processing program to be executed by a computer in an information processing device for performing a predetermined information process based on a tilt angle of an input device that can be rotated to any tilt about a predetermined axis, the information processing program comprising instructions causing the computer to perform:
calculating a tilt angle representing the tilt of the input device;
determining whether the tilt angle calculated by the angle calculation has transitioned across a boundary at which an upper limit value and a lower limit value of the tilt angle adjoin each other including determining whether the calculated tilt angle has transitioned from a first range to a second range, where the first range is a range from a first limit value of the tilt angle to a predetermined first angle that is closer to the first limit value than to a second limit value of the tilt angle, and the second range is a range from the second limit value of the tilt angle to a predetermined second angle that is closer to the second limit value than to the first limit value; and
if the tilt angle has transitioned from the first range to the second range across the boundary, correcting the tilt angle used in the predetermined information process to a predetermined value that is on one side of the boundary on which the tilt angle was before crossing the boundary by correcting the tilt angle used in the predetermined information process to a predetermined value within the first range.

* * * * *